(12) United States Patent
Arabo et al.

(10) Patent No.: US 10,855,788 B2
(45) Date of Patent: Dec. 1, 2020

(54) METHODS AND SYSTEMS FOR PRIORITY-BASED NOTIFICATIONS FOR MOBILE DEVICES

(71) Applicant: salesforce.com, inc., San Francisco, CA (US)

(72) Inventors: Mohamed Arabo, Kirkland, WA (US); Joshua Schneyer, Monrovia, CA (US); Jason Schroeder, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 53 days.

(21) Appl. No.: 16/227,194

(22) Filed: Dec. 20, 2018

(65) Prior Publication Data

US 2019/0124172 A1    Apr. 25, 2019

Related U.S. Application Data

(63) Continuation of application No. 15/333,091, filed on Oct. 24, 2016, now Pat. No. 10,200,487, which is a continuation of application No. 13/925,721, filed on Jun. 24, 2013, now Pat. No. 9,479,387.

(60) Provisional application No. 61/663,042, filed on Jun. 22, 2012.

(51) Int. Cl.
*G06F 15/16* (2006.01)
*H04L 29/08* (2006.01)

(52) U.S. Cl.
CPC ........ *H04L 67/26* (2013.01); *H04L 29/08693* (2013.01); *H04L 67/322* (2013.01)

(58) Field of Classification Search
CPC .. H04L 67/26; H04L 67/322; H04L 29/08693
USPC ......................................................... 709/206
See application file for complete search history.

(56) References Cited

U.S. PATENT DOCUMENTS

| | | | |
|---|---|---|---|
| 2012/0221961 A1* | 8/2012 | Reynolds ............. | G06Q 10/107 715/752 |
| 2013/0084896 A1* | 4/2013 | Barkie .................. | H04W 12/02 455/466 |
| 2013/0241918 A1* | 9/2013 | Satyan .................... | G06F 9/542 345/418 |
| 2013/0288722 A1* | 10/2013 | Ramanujam ............ | H04W 4/14 455/466 |

* cited by examiner

*Primary Examiner* — Wing F Chan
*Assistant Examiner* — Joseph R Maniwang
(74) *Attorney, Agent, or Firm* — Holland & Hart LLP

(57) ABSTRACT

A method comprising of receiving, by a user system that includes at least a processor system having at least one processor and a memory system, a first push notification associated with a first priority level for display on the user system; receiving, by the user system, a second push notification associated with a second priority level for display on the user system, the second priority level being higher than the first priority level; and displaying, by the user system, the second push notification prior to the first push notification based on the first and second priority level.

20 Claims, 17 Drawing Sheets

METHODS AND SYSTEMS FOR PRIORITY-BASED NOTIFICATIONS FOR MOBILE DEVICES

CROSS REFERENCES

This application is a continuation of U.S. patent application Ser. No. 15/333,091, entitled "Methods and Systems for Priority-Based Notifications for Mobile Devices," by Arabo et al., filed Oct. 24, 2016, which is a continuation of U.S. patent application Ser. No. 13/925,721, entitled "Methods And Systems For Priority-Based Notifications For Mobile Devices," by Arabo et al., filed Jun. 24, 2013, which issued Oct. 25, 2016 as U.S. Pat. No. 9,479,387, which claims the benefit of U.S. Provisional Patent Application No. 61/663,042, entitled "Priority-Based Notifications For Mobile Devices," by Mohamad Arabo et al., filed Jun. 22, 2012, the entire contents of which are incorporated herein by reference.

COPYRIGHT NOTICE

A portion of the disclosure of this patent document includes material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

One or more implementations relate generally to push notifications.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section merely represents different approaches, which in and of themselves may also be inventions.

Presently, most push notifications are organized chronologically. Push notifications appear in the order received, and the user can only change the order of appearance by the notifying application. In other words, Chatter® notifications may be ordered to appear before email notifications, but the individual Chatter® notifications may not be reorganized. However, a user's device may only be online and/or in a position to receive notifications for brief periods, which may be missed.

Accordingly, it may be desirable to provide techniques for reorganizing push notifications so that users may be notified of important messages. It also may be desirable to send messages with an appropriate priority, such that important messages are sent first and such that important messages are sent with a frequency or at a time to ensure that the message reaches the user as quickly as possible given the device's availability windows.

BRIEF DESCRIPTION OF THE DRAWINGS

In the following drawings, like reference numbers are used to refer to like elements. Although the following figures depict various examples, the one or more implementations are not limited to the examples depicted in the figures.

DETAILED DESCRIPTION

General Overview

Figure 1:
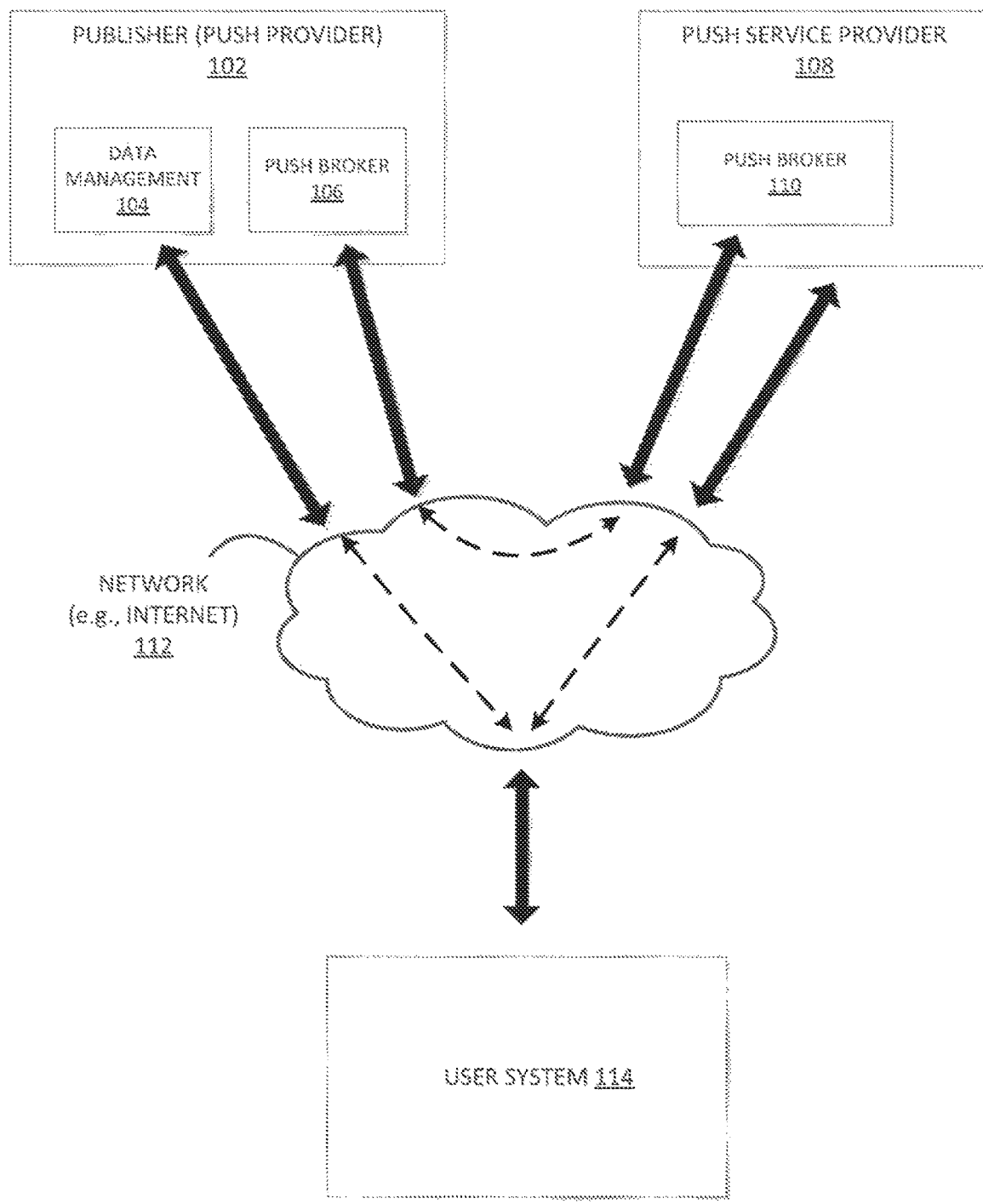
FIG. 1 shows a block diagram of an embodiment of a network-based system demonstrating the interaction between a publisher, a push service provider, and a user system.

Systems and methods are provided for organizing notifications based on priority for mobile devices. Note that although various implementations are described in the context of a multi-tenant database network system (or multi-tenant database system), these and other implementations may also be utilized in other environments as well, for example, on-demand service environments, LAN systems, WAN systems, database systems, etc.

As used herein, the term multi-tenant database system refers to a database system that has multiple tenants that each has a degree of access to at least a portion of the database system that may or may not be the same as the degree of access as other tenants. Each tenant may be an individual or an organization that may have representatives, members, employees, customers and/or other entities associated with the tenant, which in turn, as a result of the tenancy of the tenant in the multi-tenant database, may also have different degrees of access to the database. The degree of access granted to those associated with the tenant and/or which entities (e.g., representatives, members, employees, customers and/or other entities) are associated with the tenant may be determined by the tenant. The database system may include multiple databases, and each database may be partitioned and/or otherwise shared amongst multiple tenants. The multi-tenant database may be provided on demand, that is as a service to the tenants, so that the tenants have use of the multi-tenant database for their own purposes that determined by the tenants, but the tenants do not need to worry about the maintaining the database, the operations of the database, or how the database works.

In an implementation involving a banking application, a user might receive a push notification when a monthly account statement is ready. In this specification, a push notification is a notification that is sent using push technology. A push is any message sent that is initiated by the sender. A receiver of the push may need to sign up for, or subscribe to, a particular service at the sender's system. Then when information is available related to that service, the sender will send the content, without waiting for the receiver to request the information. A push notification may be an alert or any notification sent at the initiation of the sender. A push notification may be sent via a push service provider according to a particular protocol and/or message format. In which case the sender, which is the publisher of the push notification, sends the notification to the push notification provider, which in turn forwards the message according to the protocol to the receiver. In banking, the user may see the push notification and may disregard the push notification, or may not see the push notification at all since the push notification may be buried between a series of other notifications. While disregarding or not seeing the push notification may not be an issue for a monthly account statement, disregarding or not seeing the push notification would not be the desired behavior for push notifications that may require action, such as a bounced check, overage, compromised account, etc. Prioritized push notifications as described herein would overcome these deficiencies and would highlight, emphasize, or otherwise alter the display of push notifications to indicate that action is required.

In an implementation involving a customer relationship management (CRM) application, such as Salesforce®, prioritized push notifications may be used to highlight, emphasize, or otherwise alter the display of push notifications associated with high-priority customers. In an implementation, push notifications can be include a button or other display to indicate receipt and/or acknowledgment of the notification. As a result of prioritization, messages are sent with an appropriate priority, such that important messages are sent first and are sent with a frequency or at a time to ensure that the message reaches the user as quickly as possible given the device's availability windows. If there is no acknowledgement of the message being received, the message may be resent more frequently, depending on the priority until an acknowledgement is received. Also, the user settings may include times of day during which the user is more likely to be connected to the network, and higher priority messages (messages that have higher than a predetermined level of priority) may be sent and/or resent during the times that the user indicated that user is available.

Below, mechanisms and methods for organizing notifications based on priority will be described with reference to example embodiments.

FIG. 1 shows an embodiment of a network-based system 100 demonstrating the interaction between a publisher, a push service provider, and a user system. Network-based system 100 may include a publisher 102, data management 104, a push broker 106, a push service provider 108, a push broker 110, a network 112, and a user system 114. In other embodiments, network-based system 100 may not have all of the elements or features listed and/or may have other elements or features instead of or in addition to those listed.

Network-based system 100 is a system for sending, receiving, and organizing push notifications. Push notifications are information, such as chat messages, alerts, warnings, and files, that are sent from publishers to users, who have opted in to receive the push notifications.

Publisher 102 is any central server that provides push notifications and other information to a user. Other information is any information, such as application settings and user login information, that is unrelated to push notifications. Some non-limiting examples of publisher 102 may be a banking application or a CRM application, such as Salesforce®, SAP, and Oracle.

Data management 104 manages the data on the system of publisher 102. Data management 104 may include a multi-tenant database, for example. Push broker 106 is the computer code that handles the processing of the push notifications prior to sending the push notification for the publisher 102 and handles the processing of confirmations of push notification receipts that are received from the push service provider. The push notifications may have a special protocol according to which the push notifications are formatted and sent, which may be unique to the push notification provider. Push broker 106 ensure that push notifications are in compliance with the protocol of the push notifications, so that the push notification provider will accept the push notifications, recognize the push notifications as push notifications, and process the push notifications as intended by publisher 102. Through push broker 106, publisher 102 sends push notifications to the push service provider. Publisher 102 may include a data management 104 and a push broker 106.

Push service provider 108 is any server of a push notification service provider, such as Apple Push Notification Service (APNS), Google Cloud Messaging for Android (GCM), or BlackBerry® Push Service, that sends notification messages on behalf of publishers of push notifications, such as publisher 102, to client terminals, such as user systems 114. Push service provider 108 determines the protocol required for the push notifications. Push broker 110 is computer code that handles the receiving of push notifications from publisher 102 for the push service provider 108 according to the protocol of the push service provider 108. Push broker 110 may ensure that the push notifications conform to the push notification protocol. Push broker 110 receives push notifications from the publisher 102 and may send confirmations of receipt of the push notification to publisher 102. In an embodiment, push broker 110 sends a confirmation message to publisher 102 after push broker 110 has received a push notification. Push service provider 108 may include a push broker 110.

Network 112 is any computer network, such as a Wide Area Network (WAN) or Local Area Network (LAN), such as the Internet or an intranet.

User system 114 is a device with a network interface such as a desktop computer, laptop, tablet, or portable computing device. User system 114 may include a plurality of user systems that connect to publisher 102 and push service provider 108, via network 112. User system 114 may be a device having at least one or more processors, a memory system, an input/output system, and a network interface, for example. User system 114 may also be a mobile communication device such as a cellular phone or smart phone. Anywhere in this specification where the word "system" appears, the word "device" may be substituted to obtain a more specific embodiment. In an embodiment, the majority of communications are between user system 114 and publisher 102. The communications relate to the services provided by push publication publisher 102 to user system 114. For example, push notification provider 102 may provide an on-demand multitenant database that user system 114 accesses, and the vast majority of communications relate to the on-demand multi-tenant database. The push notifications may relate to events within the on-demand multi-tenant database that require the attention of the user. User system 114 may download applications from publisher 102 for interacting with publisher 102 (e.g., for interacting with the on-demand multitenant database). The push notifications are sent in relation to the multitenant database and/or other service provided by publisher 102. For example, the push notifications may be alerts sent to user system 114 regarding usage limits limiting usage of the multitenant database that the user is approaching.

Publisher Memory System

Figure 2:
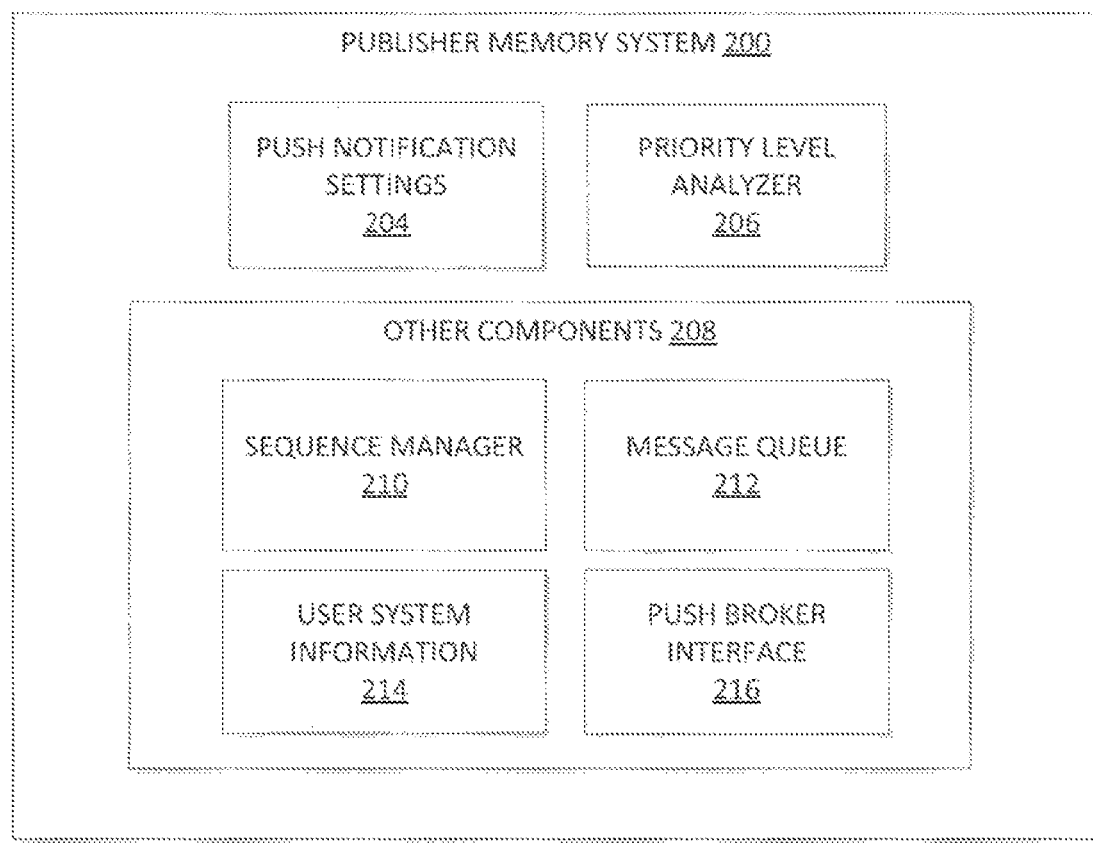
FIG. 2 shows a block diagram of an embodiment of a memory system of a publisher.

FIG. 2 shows a block diagram of an embodiment of a publisher memory system 200. In an embodiment, publisher memory system 200 includes push notification settings 204, priority level analyzer 206, other components 208, sequence manager 210, message queue 212, user system information 214, and a push broker interface 216. In other embodiments, publisher memory system 200 may not have all of the elements or features listed and/or may have other elements or features instead of or in addition to those listed.

Publisher memory system 200 is the memory system that stores the information and programs for performing operations needed for publisher 102 to carry out the server functions.

Push notification settings 204 stores the settings for the push notifications that are sent to the user system 114. Push notification settings 204 may include settings that determine information pertaining to the number of and optionally the types of priority levels for push notifications. For example, push notification settings 204 may include information on three different priority levels of push notifications: high, normal, and low. In such example, a high priority level push notification is sent to the push service provider 108 before a normal priority level push notification and a low priority level push notification. Also in this example, if a high priority level push notification fails to be received by the push service provider 108, the publisher 102 will try more attempts to send the high priority level push notification than if a normal priority level or a low priority level push notification fails to be received by the push service provider 108.

Push notification settings 204 may also include settings that determine how push notifications will be displayed on user system 114. In an embodiment, the push notification settings 204 are default settings, which are applied by default. The push notification settings 204 may depend upon what is available to the particular user system, via a particular push service provider 108. For example, if the user system 114 is an Apple device, the user can only see display settings of the different priority levels available to an Apple device.

In an embodiment, push notification settings 204 may include display settings for varying priority levels and for different push service providers. The display settings may include display methods such as alert, alarm, pop-up, and badge count. In this specification, the badge is a portion of the interface on the user mobile device that has a number representative of how many of a particular type of message are waiting to be read. For example, the badge may be a red circle with a number in it, which may be placed in a location that is associated with alerts, so that the user readily identifies that there are as many alerts waiting to be responded to, as the number in the circle. For example, the badge may appear adjacent to the word 'alert'. The badge count is the number in the badge representative of the number of that particular type of push notification that are waiting to be addressed. Push notification settings 204 may include display settings for varying priority levels and for different push service providers. For example, if there are two priority levels (high and normal) and two types of push service providers (Apple and Google), push notification settings 204 may include a display setting such as a pop-up notification for a high priority level push notification on an Apple device, a display setting such as a badge count notification for a normal priority level push notification on an Apple device, a display setting such as an alarm notification for a high priority level push notification on an Android device, and a display setting such as an alert notification for a normal priority level push notification on an Android device. Although this example only has two priority levels, there may be any number of priority levels.

Push notification settings 204 may include settings that determine the information for how an end user receiving the push notification can clear or otherwise acknowledge the push notification. For example, push notification settings 204 may include an acknowledgment setting that is an audio alert that increases in volume or frequency until the user acknowledges the push notification. Another example of an acknowledgment setting is a setting that displays a pop-up button that will not disappear until the user presses the button, which indicates to the publisher 102 that the user has acknowledged the push notification.

In an embodiment, push notification settings 204 may receive the display settings and the acknowledgment settings from the administrator of publisher 102. In an embodiment, the administrator may set default settings, which are applied by default. The display settings may depend upon the display settings available to the particular user system, via a particular push service provider 108. In another embodiment, the display settings and the acknowledgment settings can be modified by the user after the publisher 102 sends the default settings to the user system 114 and receives the modified settings from the user system 114. In an embodiment, at least one display setting and at least one acknowledgment setting are selected for a push notification. The display setting and the acknowledgment setting may be stored in the push notification's metadata.

In an embodiment, the application developer, the publisher, the administrator, and/or other user having sufficient privileges may determine the settings for push notification settings 204.

Priority level analyzer 206 evaluates the payload of the push notification to determine a priority level. The payload is the content of the push notification. The payload may include text and/or images. The content may include an express value of the priority level or the value of the priority level may derived from the type of content. For example, the priority level analyzer may detect that the notification is of a type that is particularly urgent. For example, if the publisher is a bank, and the push notification is a notification that an account is overdrawn, upon detecting that the content of the push notification is that an account is overdrawn, a priority level analyzer may assign a high priority level so that immediate action may be taken. By assigning a high priority level, the user may have the opportunity to replenish the account and avoid any negative consequences. Priority level analyzer 206 may also determine the priority level using the payload and other information, such as flags that are attached to the push notification indicating the push notification's importance (stored in push notification's content and/or metadata) and the number of priority levels (stored in push notification settings 204). The other information may be included in the push notification's metadata and/or content. The priority level may be stored in the push notification's metadata and/or content. In an embodiment, the priority level may not be stored in the push notification.

Other components 208 include any other operations that may be carried out by publisher 200. For example, other components 208 may include software that is related to the primary services provided by publisher 102. For example, if the publisher 102 is a bank, other components 208 may include software for tracking conducting monetary transactions and/or for tracking account balances of customers of the bank. If publisher 102 is an on-demand multitenant database provide, other components 208 may include a database server, user interface, and database of the multi-tenant database system. Other components 208 may perform other operations that assist in sending and organizing push notifications. The operations within other components 208 are optional.

In an embodiment, other components 208 include the sequence manager 210, which places the push notification in the message queue in a particular sequence, which may be based on priority level, the size of the message, and/or the length of time that the message has been in the message queue. Push notifications may have an expiration date that is stored in the metadata of the push notification. The Sequence Manager 210 may remove push notifications that have not yet been delivered before the expiration date of the push notification. The expiration date would be contained in the push notification metadata.

Message queue 212 stores the order in which the push notifications are to be sent to push service provider 108. Message queue 212 is a queue of messages waiting to be sent to another system. In an embodiment, a push notification with a higher priority level is placed closer to the top of the message queue 212 than a push notification with a lower priority level. In this specification, the top of the queue is the end of the queue from which push notification leaves. In an embodiment, the push notification at the top of the queue is sent first. The lower the push notification is in the queue, the further the push notification is from the top and the longer the queue will take before the push notification is sent. Every time a push notification leaves the queue, all of the push notifications remaining in the queue are moved up one push notification closer to the top of the queue.

Optionally, push notifications with the same priority level are sorted by user subscription level first and then chronologically in the message queue 212. Within the same priority level, the push notifications with a higher user subscription level may be placed closer to the top of the queue than push notifications with a lower user subscription level. Push notifications with a lower user subscription level are placed closer to the top of the queue than push notifications with no subscription level. In the chronological sort, older push notifications are placed closer to the top of the queue.

Push broker 216 may be an embodiment of push broker 106. The push broker interface 216 communicates with push broker in the push service provider to send and confirm receipt of the push notification from publisher 200 at the push service provider 300, according to the protocol of the push service provider 300. Push broker 106 are sent to the correct push service provider 108 based on the device type of user system 114 (within the push notification's metadata). For example, push broker 106 sends push notifications to Apple Push Notification Service (APNS) for push notifications that have "Apple" as the provider and/or device type.

Other components 208 may also include user system information 214, which stores the settings of the user system 114. User system information 214 may include information such as the address of the user system 114, the number of different applications on the user system 114, the identifiers of the applications, the user subscription level, and the device type of user system 114. The information from user system information 214 may be used to determine where the push notification should be sent. For example, the push service provider 108 may use the address of the user system 114 stored in user system information 214 to determine which user system 114 the push notification should go. As another example, there may be a number of different applications on the user system 114. The identifiers of the applications may be stored in user system information 214, which may be sent with the push notification to push service provider 108 by publisher 102 (push service provider 108 may pass the identifier to user system 114, where the identifier may be used to determine which application within the user system 114 the push notification should be sent).

Optionally, the publisher 102 may store the subscription level in user system information 214, and publisher 102 may use the user subscription level for determining priority or as an additional field for determining the order in which push notifications are sent. For example, a high-priority push notification of a user with an elite subscription level may be sent before a high-priority push notification of a user with a basic subscription level or with no subscription. For certain applications, there may be different levels of paid subscribers. For example, higher subscription users may gain certain perks such as receiving important push notifications before non-subscribing users.

Also, optionally, publisher 102 may store the device type of the user system 114 in user system information 214, and the device type may be used to determine which display settings and/or acknowledgment settings are compatible with user system 114 (which is destination of the push notification). Information from user system information 214 may be stored in the push notification's metadata.

In an embodiment, other components 208 may include other operations that determine the display settings for a push notification, and the range of possible display settings available to a particular user may be stored in user system information 214. The push notification's display setting may be selected from user system information 214 and placed in push notification settings 204, based upon the priority level and the device type of the user system 114. For example, publisher 102 may select a pop-up type display setting for a high priority-level push notification going to an Apple device. On the other hand, publisher 102 may select an alarm type display setting for a high priority-level push notification going to an Android device. The selected display setting may be stored in the push notification's metadata.

In some embodiments, other components 208 may include operations that determine, optionally, the acknowledgment setting for a push notification available to a particular user, which may be stored in user system information 214. Similar to selecting the display setting, the acknowledgment setting from user system information 214 and placed in push notification settings 204, which determines the acknowledgment setting based upon the push notification's priority level and the device type of the user system 114. For example, if the destination of the push notification is an Apple device, the publisher 102 may select an acknowledgment button setting as opposed to an audio alert acknowledgment setting for a push notification going to an Android device.

In embodiments having an acknowledgment button setting, an acknowledgment message may be sent from the user system 114 to publisher 102 after the user has pressed the button, indicating to the publisher 102 that the user has acknowledged and/or acted on the push notification. The selected acknowledgment setting may be stored in the push notification's metadata.

In an embodiment, other components 208 may include operations that monitor whether push notifications are received by the push service provider 108. For example, the publisher 102 receives a confirmation message from the push service provider 108 when the push service provider 108 has successfully received the push notification. In this example, if publisher 102 does not receive a confirmation message within a pre-determined time, publisher 102 resends the push notification to the push broker 106 to be resent to the push service provider 108. Furthermore, in this example, publisher 102 continues to resend the push notification until the publisher 102 has attempted to resend a pre-determined number of times or until the publisher 102 has received a confirmation message from push service provider 108. In this example, the number of attempts may be based upon the priority level of the push notification. For example, publisher 102 may try more attempts to resend a higher priority level push notification than a lower priority push notification.

Push broker interface 216 is an embodiment of push broker 106. The push broker interface 216 communicates with push broker interface 308 to send and confirm receipt of the push notification from push service provider 300 at the publisher 200, according to the protocol of the publisher 200. Push notifications at the push broker interface 216 are sent to the correct push service provider 108 based on the device type of the user system 114 (in the push notification's metadata).

Push Service Provider Memory System

Figure 3:
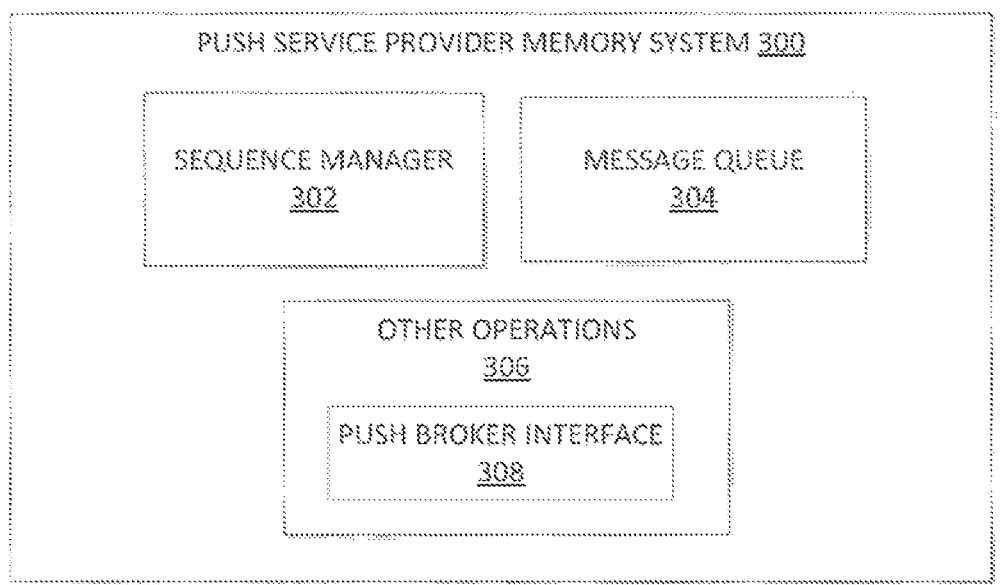
FIG. 3 shows a block diagram of an embodiment of a memory system of a push service provider.

FIG. 3 shows a block diagram of an embodiment of a push service provider memory system 300. Push service provider memory system 300 includes a sequence manager 302, a message queue 304, other operations 306, and push broker interface 308. In other embodiments, system 300 may not have all of the elements or features listed and/or may have other elements or features instead of or in addition to those listed.

Push service provider memory system 300 is the memory system that stores the information and programs for performing operations needed for push service provider 108 to carry out the server functions.

Sequence manager 302 determines the order the push notifications are placed in the message queue of the push service provider 108. The sequence manager 302 may place the push notification in the message queue chronologically. In an embodiment, the sequence manager 302 places the push notification in the message queue based on priority level. In this embodiment, the sequence manager 302 may operate similar to sequence manager 210, where the push notifications are organized with higher priority push notifications closer to the top of the queue than lower priority push notifications. Like sequence 210, the sequence manager 302 may use the subscription level of publisher 102 and/or of the user and the time the push notification was received as additional fields to organize the push notifications within the message queue in the event there are multiple push notifications with the same priority level.

Like message queue 212, message queue 304 is a queue of messages waiting to be sent to another system. Sequence manager 302 may determine the order of the messages in message queue 304. Message queue 304 stores the order in which the push notifications are to be sent to the user system.

Other operations 306 may includes any other operations performed by the push service provider 300 that relate to other business performed by the push service provider 108. For example, other operations may include operations for downloading music and/or performing searches. Other operations 306 may perform other operations that assist in receiving, sending, and organizing push notifications. The operations within other operations 306 are optional.

In an embodiment, other operations 306 may include operations that handle receiving the push notification from the publisher 102 and sending a confirmation message to the publisher 102 indicating that the push service provider 108 has received the push notification.

In another embodiment, other operations 306 may include operations that monitor whether a push notification is received by the user system 114. For example, the push service provider 108 receives a confirmation message from the user system 114 when the push notification has been successfully received by the user system 114. Also, in this example, if the push service provider 108 does not receive a confirmation message within a pre-determined time, the push service provider may resend the push notification to the user system 114. In this example, push service provider 108 may continue to resend the push notification until push service provider 108 has attempted to resend a pre-determined number of times or until push service provider 108 has received a confirmation message from user system 114. The number of attempts to resend the push notification may be based upon the priority level of the push notification. For example, push service provider 108 may try more attempts to resend a higher priority level push notification than a lower priority push notification.

Push broker interface 308 is the software interface that enables the push service provider 108 to interact with push broker 110. The push broker interface 308 may be an embodiment of push broker 110.

User Memory System

Figure 4:
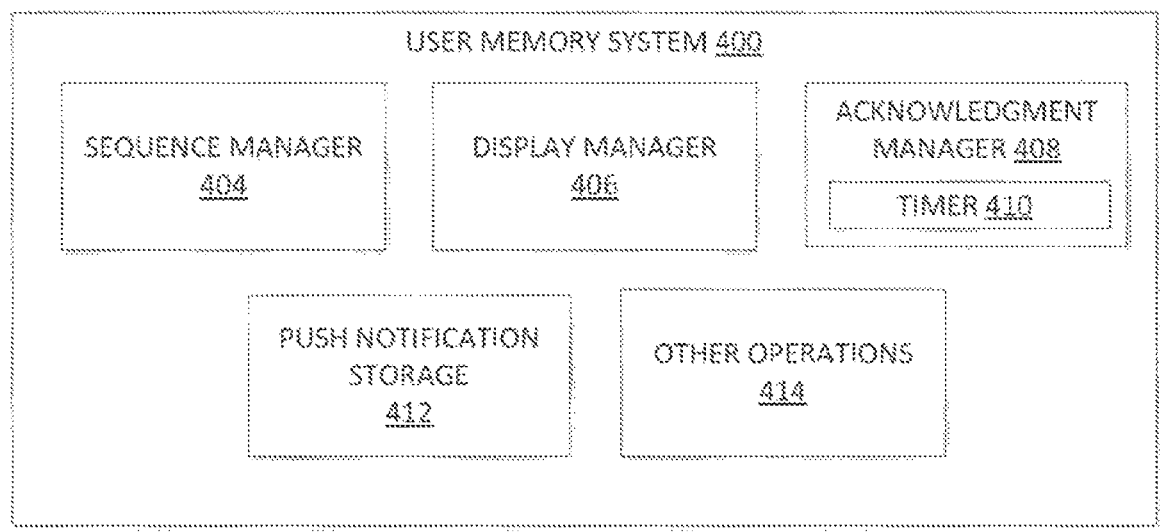
FIG. 4 shows a block diagram of an embodiment of a memory system of a user system.

FIG. 4 shows a block diagram of an embodiment of a user memory system 400. User memory system 400 includes sequence manager 404, display manager 406, acknowledgment manager 408, timer 410, push notification storage 412, and other operations 414. In other embodiments, system 400 may not have all of the elements or features listed and/or may have other elements or features instead of or in addition to those listed.

User memory system 400 is the memory system that stores the information and programs for performing the operations needed for user system 114 to carry out the device functions.

The sequence manager 404 places the push notifications in a message queue based mainly on the push notification's priority level. The message queue, located within the sequence manager 404, stores the order in which the push notifications are displayed on the user system screen. Sequence manager 404 may place a push notification with a higher priority level closer to the top of the message queue than a push notification with a lower priority level. The top of the queue is the end of the queue from which push notifications are first displayed. The push notification at the top of the queue is displayed first. The lower the push notification is in the queue, the further the push notification is from the top and the longer the queue will take before the push notification is displayed. Every time a push notification is displayed, the push notification is removed from the queue, and all of the push notifications remaining in the queue are moved up one push notification closer to the top of the queue.

Starting from the top of the queue, display manager 406 analyzes the push notifications in the message queue and displays the content of the push notification based on the push notification's display setting in the push notification's metadata.

Acknowledgment manager 408 determines whether the push notification has an acknowledgment setting in the push notification's metadata and, if there is an acknowledgment setting, the acknowledgment manager 408 follows the instructions of the acknowledgment setting. For example, the acknowledgment setting may instruct the user system 114 to display an acknowledgment button.

In an embodiment, the activated acknowledgment setting may require the user to recognize the push notification and perform an instructed action to turn the notification off or to turn off a particular mode of displaying the notification. For example, based on the acknowledgment setting, the user system 114 may display a separate button next to the push notification content, requiring the user to press the button in acknowledgment of the push notification. In this example, if the button is not pressed within a pre-determined period of time, the button disappears and reappears at pre-determined intervals until the user presses the button. Furthermore, in this example, a confirmation message may be sent to the publisher 102 after the user has pressed the button, acknowledging the push notification. In another embodiment, the button and the push notification content are displayed together. In some embodiments, the acknowledgment setting may be an audio alert that may increase in volume or frequency. In other embodiments, other acknowledgement settings may be used.

Within the acknowledgment manager 408, timer 410 is a portion of code that assists the acknowledgment manager 408 by determining how long an acknowledgment should be activated. For example, timer 410 may calculate how long the user system 114 displays the acknowledgment button. The length of time the acknowledgment button is displayed on user system 114 may be pre-determined at the publisher 200 and/or provider 300, based on the priority level and/or user settings. In an embodiment, in the event that the user does not acknowledge the push notification, timer 410 measures how long until the acknowledgment button disappears from the user system's screen and how long until the acknowledgment button reappears on the screen.

Push notification storage 412 stores the push notifications. Push notifications are added to push notification storages as the push notifications are received. After being received, the push notification may remain may in push notification storage 412 until manually deleted, until the push notification is over a predetermined age (e.g., until the push notification has expired), push notification storage 412 is full, acknowledged, and/or viewed, according to the user settings on user device 114.

Other operations 414 may include any other operations performed by the user system 400. For example, other operations 414 may perform operations that assist in displaying and organizing push notifications. The operations within other operations 414 are optional.

For example, other operations 414 may include operations that handle receiving the push notification from the push service provider 108 and sending a confirmation message to the push service provider 108 indicating that the user system 114 has received the push notification.

Push Notification

Figure 5:
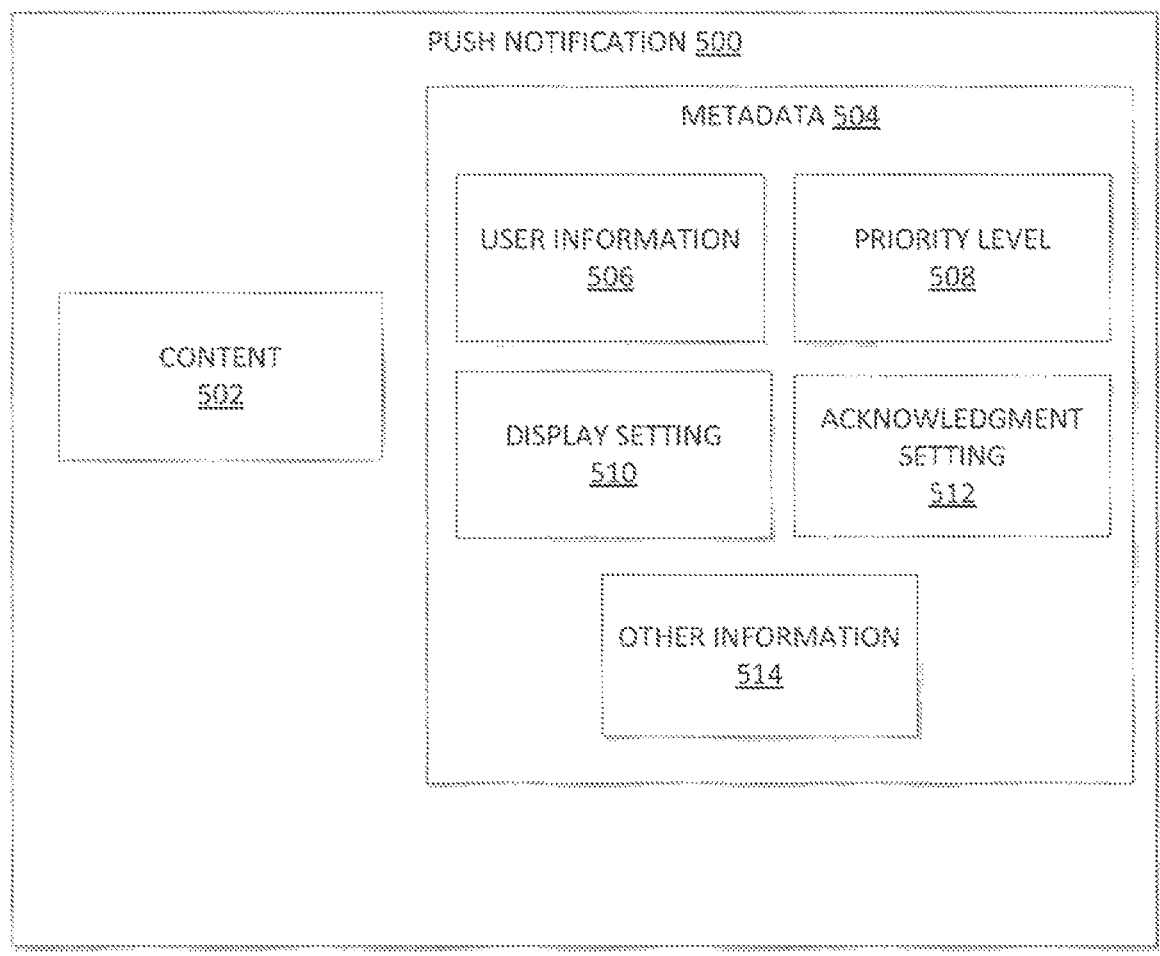
FIG. 5 shows a block diagram of an embodiment of a push notification.

FIG. 5 shows a block diagram of an embodiment of a push notification 500. Push notification 500 includes content 502, metadata 504, user information 506, priority level 508, display settings 510, and acknowledgment settings 512. In other embodiments, system 500 may not have all of the elements or features listed and/or may have other elements or features instead of or in addition to those listed.

Content 502 includes the push notification message. The push notification message may be text and/or image. Content 502 may include the priority level. Metadata 504 includes the information needed for organizing and displaying the push notification. Metadata 504 includes user information 506, priority level 508, display settings 510, and acknowledgment settings 512.

User information 506 includes some or all of the user's information that the publisher 102 received from user system 114, which may be needed by push service provider 108 and/or user system 114 for properly processing push notification 500. For example, user information 506 may include the address of the user system 114, the number of different applications on the user system 114, the identifiers of applications, the user subscription level, and the device type of user system 114.

Priority level 508 is the priority level of the push notification. After the payload analyzer 210 in the publisher 102 determines the priority level, the priority level is stored in priority level 508. Alternatively, or additionally, publisher 102 may write the priority level into content 502.

Display setting 510 is the selected display setting determined by other components 208 in publisher 102. The selected display setting is based on the priority level 508 and the device type (in user information 506). The selected display setting is stored in display setting 510.

Acknowledgment setting 512 is the acknowledgment setting determined by publisher 102. The acknowledgment setting is based on the priority level 508 and the device type (in user information 506). The selected acknowledgment setting may be stored in acknowledgment setting 512. For some push notifications, acknowledgment setting 512 may not have anything stored because of the lack of an acknowledgment setting.

Other information 514 may include other information that may help in determining priority level and/or may be used in determining how to properly process push notification 500. For example, other information 514 may include flags that are attached to the push notification indicating the push notification's importance. The operations within other operations 514 are optional.

Publisher-Side Method for Setting Push Notification Settings

Figure 6:
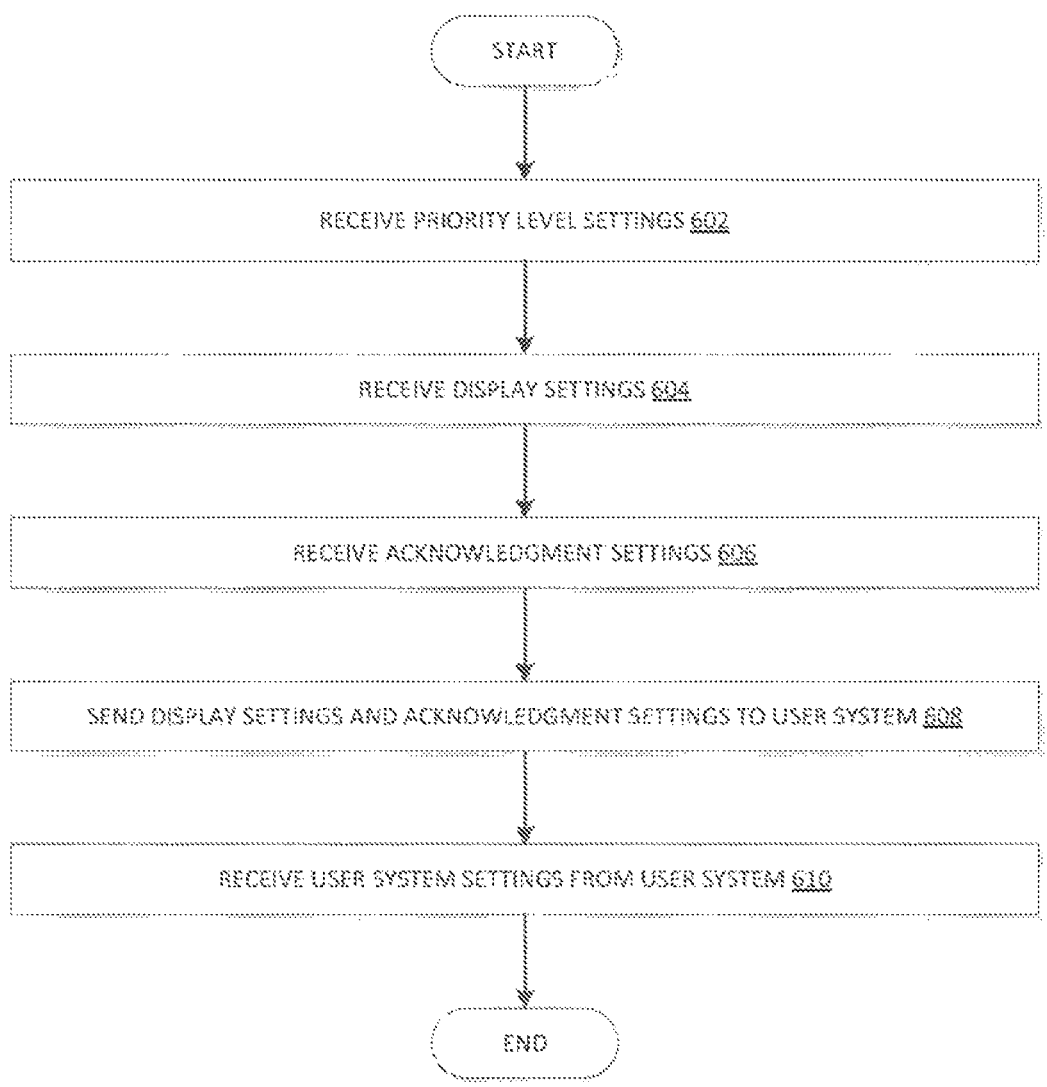
FIG. 6 shows a flowchart of an embodiment of a publisher-side method for setting and sending push notification settings to the user system.

FIG. 6 shows a flowchart of an embodiment of a publisher-side method 600 for setting and sending push notification settings to the user system 114. In step 602, the publisher 102 receives the priority level settings from an administrator or the user of publisher 102. More specifically, in step 602, the publisher 102 automatically prompts administrator to input information related to the priority level settings, information for interacting with publisher 102 in general, and/or other settings related to sending push notifications. The priority level settings may be received and stored in push notification settings 204. In an embodiment, the priority level settings may include information determining how many different priority levels of push notifications an application may have. In another embodiment, the administrator is a user of publisher 102, an application developer, or a user who has sufficient privileges.

In step 604, the publisher 102 receives display settings from administrator, an end user, or other user. More specifically, in this step, the publisher 102 automatically prompts the user of the publisher 102 to input information for the default display settings for each priority level and for each device type. The display settings may be received and stored in push notification settings 204. The display settings determine how push notifications of each priority level are displayed on each user system 114.

In step 606, the publisher 102 receives acknowledgment settings from the administrator. More specifically, in step 606, the publisher 102 automatically prompts the user of the publisher 102 to input information for the default acknowledgment settings for each priority level and for each device type. The acknowledgment settings are received and stored in push notification settings 204. The acknowledgment settings are settings for how certain push notifications should be acknowledged.

After the settings have been determined by the administrator and the application completely setup, in step 608, the publisher 102 may automatically send the display settings and acknowledgment settings to the user system 114. Step 608 is performed by data management 104. In an embodiment, the publisher 102 may receive modified display settings and acknowledgment settings from the user system 114 if the user decides to change the display settings and acknowledgment settings.

In step 610, the publisher 102 receives user system settings from the user system 114. User system settings may include information such as the address of the user system 114, the number of different applications on the user system 114, the identifiers of applications, the user subscription level, and the device type of user system 114. The user system settings are stored in user system information 214.

In an embodiment, the administrator may perform method 600 once for each type of display device. After method 600 has been performed by the administrator for a given type of display device, method 600 is performed automatically for each new user having that given type of display device.

In an embodiment, each of the steps of method 600 may be a distinct step. In other embodiments, method 600 may not have all of the above steps and/or may have other steps in addition to or instead of those listed above. The steps of method 600 may be performed in another order. Subsets of the steps listed above as part of method 600 may be used to form their own method. In an embodiment, there could be multiple instances of method 600.

User System-Side Method for Receiving and Storing Push Notification Settings

Figure 7:
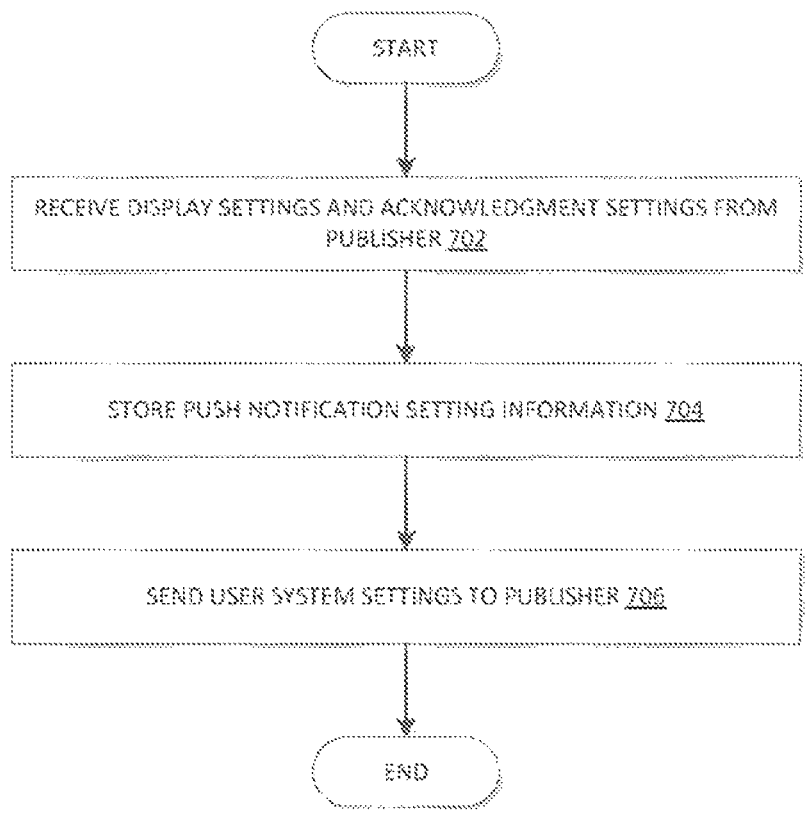
FIG. 7 shows a flowchart of an embodiment of a user system-side method for receiving and storing push notification settings.

FIG. 7 shows a flowchart of an embodiment of a user system-side method for receiving and storing push notification settings. In step 702, the user system 114 receives the display settings and the acknowledgment settings from publisher 102. In step 704, the user system 114 stores the push notification settings to be used by user system 114. In an embodiment, the user system 114 may send modified display settings and acknowledgment settings to the publisher 102 if the user decides to change the settings.

In step 706, the user system 114 sends user system settings to publisher 102. User system settings may include information about the user and/or the user system.

In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Publisher-Side Method for Organizing Push Notifications

Figure 8:
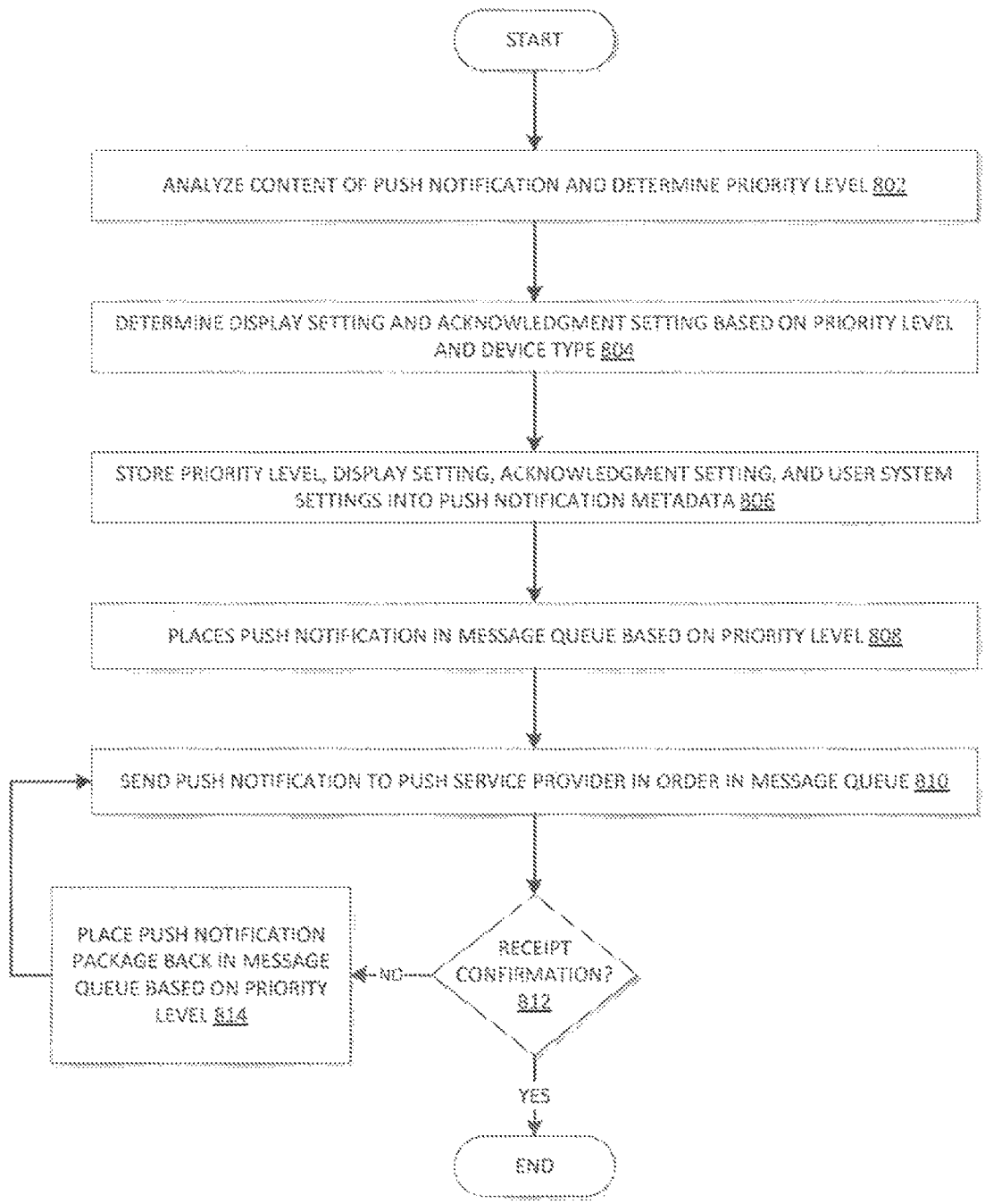
FIG. 8 shows a flowchart of an embodiment of a publisher-side method for organizing and sending push priority-based notifications to the push service provider.

FIG. 8 shows a flowchart of an embodiment of a publisher-side method 800 for organizing, and sending push priority-based notifications to the push service provider 108. In step 802, the publisher 102 analyzes the content (or payload) of a push notification and determines the priority level of the push notification. In this specification, content and payload are used interchangeably. The terms content and payload may be substituted one for another to obtain different embodiments. The content of the push notification may be text and/or image. In an embodiment, the priority level is determined based upon the content of the push notification and other information, such as flags that are attached to the push notification indicating the push notification's importance and the number of priority levels (stored in push notification settings 204). Step 802 may be performed in priority level analyzer 208.

In step 804, the publisher determines the display setting and the acknowledgment setting of the push notification based on the push notification's priority level and device type of the user system 114, where the push notification is being sent.

In step 806, the publisher 102 stores the priority level, the display setting, the acknowledgment setting, and user system information 214 into the push notification's metadata 504. In an embodiment, the priority level may be stored in the content 502 of the push notification. In another embodiment, instructions for the push service provider on how to determine the priority level of the push notification may be stored in the metadata instead of the priority level.

In step 808, the publisher 102 places the push notification in message queue 212 based on the priority level. Higher priority-level push notifications are placed higher on the queue than lower priority-level push notifications. In an embodiment, placing the push notification in the message queue may include placing an identifier of the push notification associated with a location where the push notification can be found without actually moving the storage location of the actual message. Step 808 is performed in sequence manager 210. In step 810, the publisher 102 sends the push notification to the push service provider 108 in the order in the message queue 212.

In step 812, the publisher 102 determines whether a confirmation message was received from the push service provider 108. If the publisher 102 has not received a confirmation message from the push service provider 108 within a pre-determined time, then method 800 proceeds to step 814. In step 814, the publisher 102 places the push notification back in the message queue 212 based on the priority level (at the top of own priority level group) and repeats step 810. Steps 810, 812, and 814 continues to loop until the steps have repeated a predetermined number of times or until the publisher 102 has received a confirmation message from the push service provider 108. In an embodiment, the pre-determined number of times that the publisher 102 resends the push notification depends on the priority level of the push notification. For example, a higher priority-level push notification may have more attempts by the publisher 102 than a lower priority-level push notification.

In returning to step 812, if the publisher 102 receives a confirmation message from the push service provider 108, then method 800 ends.

In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Push Service Provider-Side Method for Organizing Push Notifications

Figure 9:
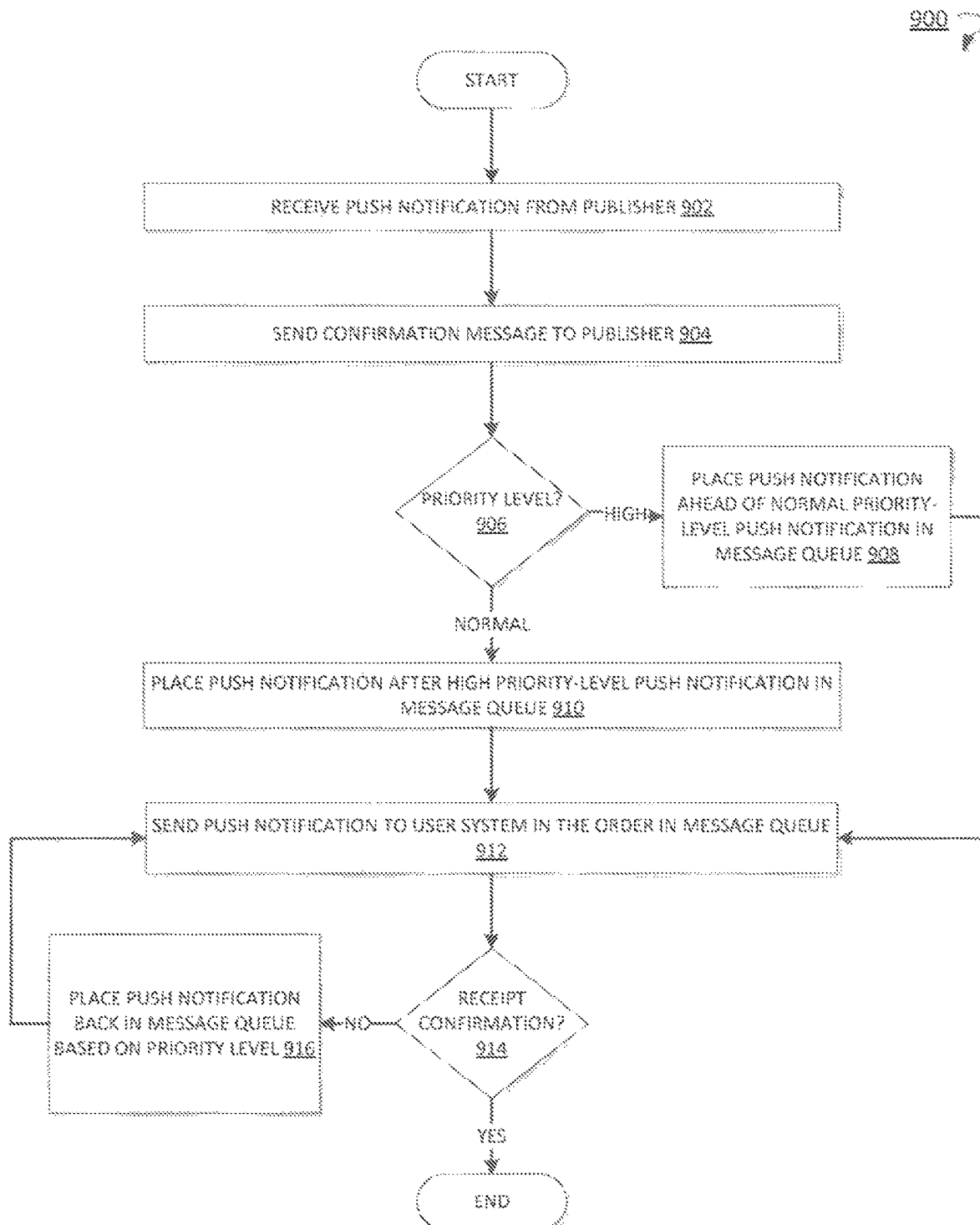
FIG. 9 shows a flowchart of an embodiment of a push service provider-side method for receiving, organizing, and sending priority-based push notifications to the user system.

FIG. 9 shows a flowchart of an embodiment of a push service provider-side method 900 for receiving, organizing, and sending priority-based push notifications to the user system 114. In step 902, the push service provider 108 receives the push notification from the publisher 102. In step 904, the push service provider 108 sends a confirmation message to the publisher 102, indicating that the push service provider 108 has received the push notification. Step 904 is performed in other operations 306.

In step 906, the push service provider 108 determines whether the push notification has a high priority level or a normal priority level. In some embodiments, there may be more than two priority levels. In embodiments having more than two priority levels, the priority levels may rank in the order of importance. If the priority level is higher than the lowest priority (or higher than a threshold priority level), then method 900 proceeds to step 908. In step 908, the push service provider 108 places the push notification ahead of lower priority-level push notifications in message queue 304. Next, the method 900 proceeds to step 912 (mentioned below).

In returning to step 906, if the priority level is the lowest priority level or not above a particular threshold priority level, then method 900 proceeds to step 910. In step 912, the push service provider 108 places the push notification after high priority-level push notification in the message queue 304. In step 912, the push service provider 108 sends the push notification to the user system 114 in the order in the message queue 304.

In step 914, the push service provider 108 determines whether the other operations 306 has received a confirmation message from user system 114. If the other operations 306 has not received a confirmation message from user system 114 within a pre-determined time, then method 900 proceeds to step 916. In step 916, the push service provider 108 places the push notification back in the message queue 304 based on the priority level and repeats step 912. Steps 912, 914, and 916 continue to loop until the steps have repeated a pre-determined number of times or until the other operations 306 has received a confirmation message from user system 114. In an embodiment, the pre-determined number of times for the other operations 306 to resend the push notification depends on the priority level of the push notification. In such embodiment, a higher priority-level push notification may have more attempts by other operations 306 than a lower priority-level push notification.

In returning to step 914, if the other operations 306 receives a confirmation message from user system 114, then method 900 ends.

In an embodiment, each of the steps of method 900 may be a distinct step. In other embodiments, method 900 may not have all of the above steps and/or may have other steps in addition to or instead of those listed above. The steps of method 900 may be performed in another order. Subsets of the steps listed above as part of method 900 may be used to form their own method. In an embodiment, there could be multiple instances of method 900.

User System-Side Method for Organizing Push Notifications

Figure 10A:
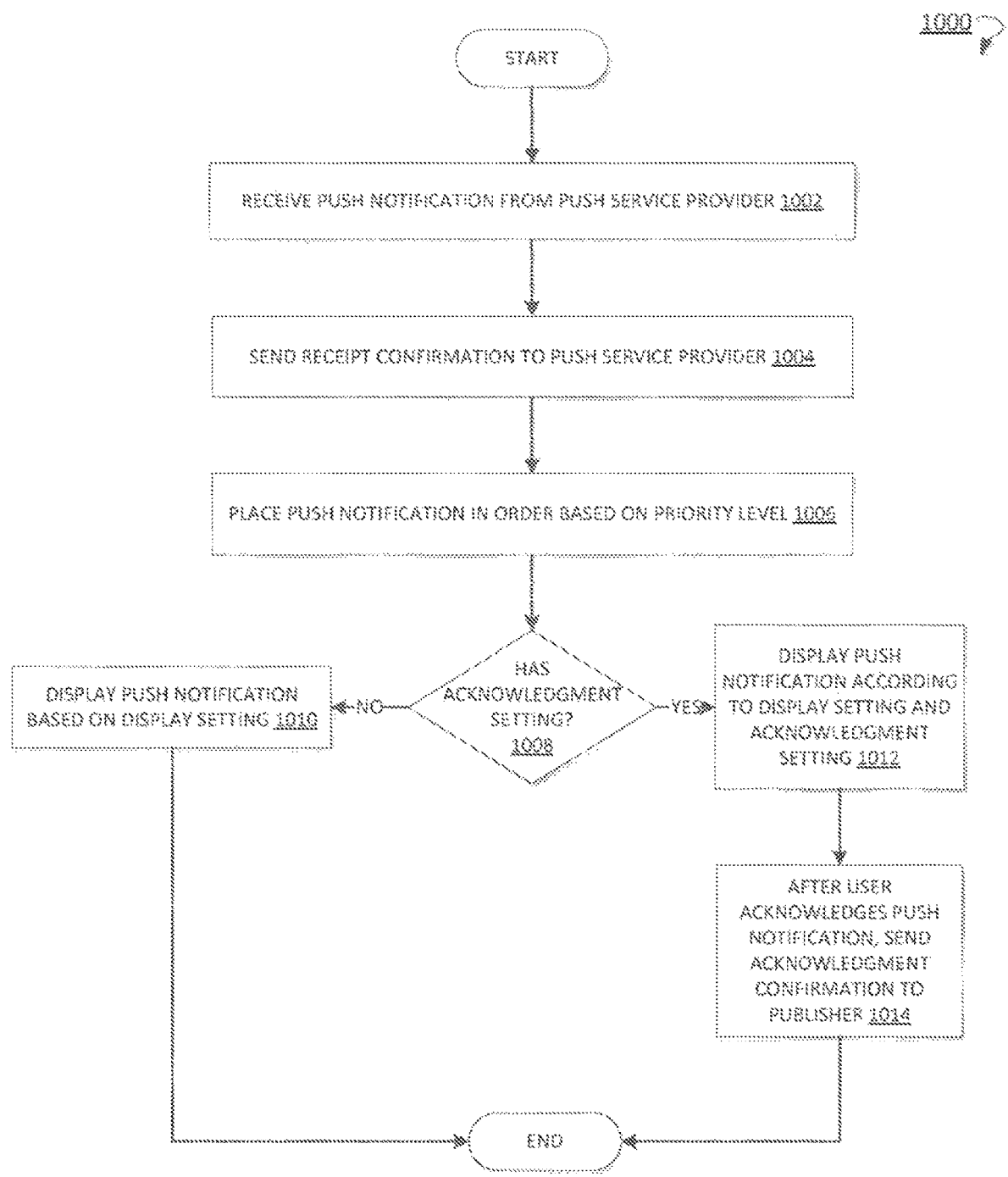
FIG. 10A shows a flowchart of an embodiment of a user system-side method for receiving, organizing, and displaying priority-based push notifications.

FIG. 10A shows a flowchart of an embodiment of a user system-side method 1000 for receiving, organizing, and displaying priority-based push notifications. In step 1002, the user system 114 receives the push notification from the push service provider 108. In step 1004, the user system 114 sends a receipt confirmation to push service provider 108. The receipt confirmation may be a confirmation message sent by user system 114.

In step 1006, the user system 114 places the push notification in the order based on the push notification's priority level. The push notification that has a higher priority level is displayed first and before push notifications that have lower priority levels. The push notification is placed in the message queue by the sequence manager 404. In step 1008, the user system 114 determines whether a push notification that is in the message queue has acknowledgment settings 512. If there is no acknowledgment settings 512 in the push notification metadata 504, then method 1000 proceeds to step 1010, where the user system 114 displays the push notification based on the display setting 510. Step 1010 may be performed by display manager 406. In an embodiment, the display setting 510 may include certain notification methods, such as alert, alarm, pop-up, and badge count. Step 1008 may be performed by acknowledgment manager 408.

Returning to step 1008, if the push notification has an acknowledgment settings, then method 1000 proceeds to step 1012. In step 1012, the user system 114 displays the push notification according to the display setting 510 and the acknowledgment settings 512 attached to the push notification. Push notification with both display and acknowledgment settings is shown on the user system 114 based on the display setting 510 and the acknowledgment settings 512 which requires the user to recognize the push notification and perform an instructed action. In an embodiment, the acknowledgment settings 512 may be a button that displays in addition to the push notification, requiring the user to press the button in acknowledgment of the push notification. If the button is not pressed within a pre-determined time, the button disappears and reappears at pre-configured intervals until user presses the button. In other embodiments, the acknowledgment settings 512 may be an audio alert that may increase in volume or frequency until the user has acknowledged the push notification.

In step 1014, after the user has acknowledged the push notification, the user system 114 sends an acknowledgment message to the publisher 102 notifying the administrator that the user has acknowledged the push notification. In an embodiment, a push notification has an acknowledgment setting that sends a message to the publisher 102 indicating that the push notification has been received. In other embodiments, a push notification has an acknowledgment setting that sends a message to the publisher 102 that action has been taken. Step 1014 may be performed by other operations 414.

In an embodiment, each of the steps of method 1000 may be a distinct step. In other embodiments, method 1000 may not have all of the above steps and/or may have other steps in addition to or instead of those listed above. The steps of method 1000 may be performed in another order. Subsets of the steps listed above as part of method 1000 may be used to form their own method. In an embodiment, there could be multiple instances of method 1000.

Figure 10B:
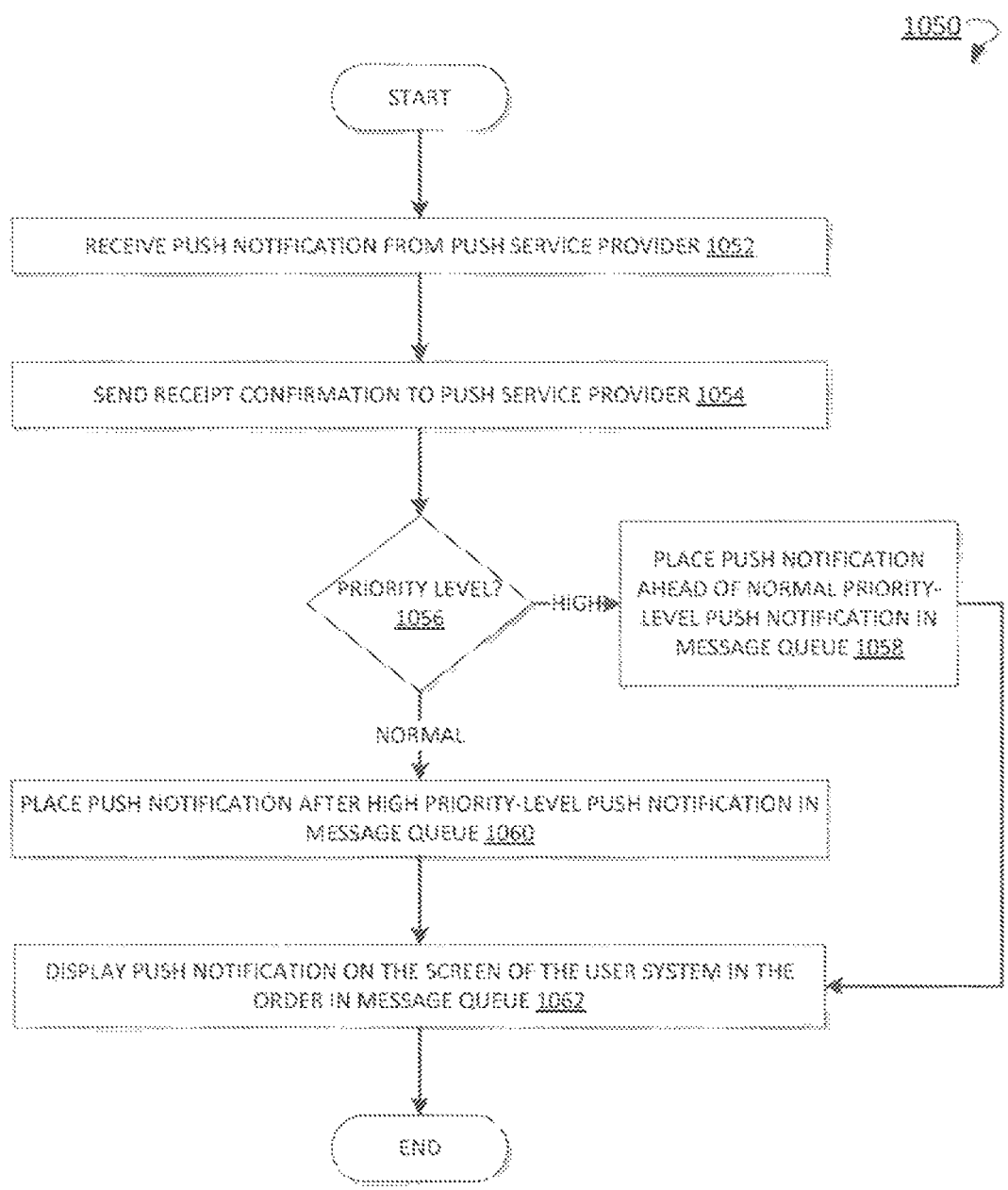
FIG. 10B shows a flowchart of an alternative embodiment of a user system-side method for receiving, organizing, and displaying priority-based push notifications.

Alternative Embodiment for a User System-Side Method for Organizing Push Notifications FIG. 10B shows a flowchart of an embodiment of a user system-side method 1050 for receiving, organizing, and displaying priority-based push notifications on the user system 114. In step 1052, the user system 114 receives the push notification from the push service provider 108. In step 1054, the user system 114 sends a confirmation message to the publisher and/or push service provider 108, indicating that the user system 114 has received the push notification. Step 1054 is optional.

In step 1056, the user system 114 determines the priority level of the push notification. In embodiments having more than two priority levels, the priority levels may rank in the order of importance. If the priority level is higher than the lowest priority (or higher than a threshold priority level), then method 1050 proceeds to step 1058. In step 1058, the user system 114 places the push notification ahead of push notifications in the message queue that have a lower priority level than the priority level of the current push notification. Next, the method 1050 proceeds to step 1062 (step 1062 is discussed below).

Returning to step 1056, if the priority level is the lowest priority level or not above a particular threshold priority level, then method 1050 proceeds to step 1060. In step 1060, the user system 114 places the push notification after higher priority-level push notification in the message queue. In step 1062, the user system 114 displays the push notification on the screen of the user system 114 in the order in the message queue. The push notification is displayed according to the push notification's display setting and acknowledgment setting.

In an embodiment, each of the steps of method 1050 may be a distinct step. In other embodiments, method 1050 may not have all of the above steps and/or may have other steps in addition to or instead of those listed above. The steps of method 1050 may be performed in another order. Subsets of the steps listed above as part of method 1050 may be used to form their own method. In an embodiment, there could be multiple instances of method 1050.

Publisher'S and Push Service Provider'S Computer System

Figure 11:
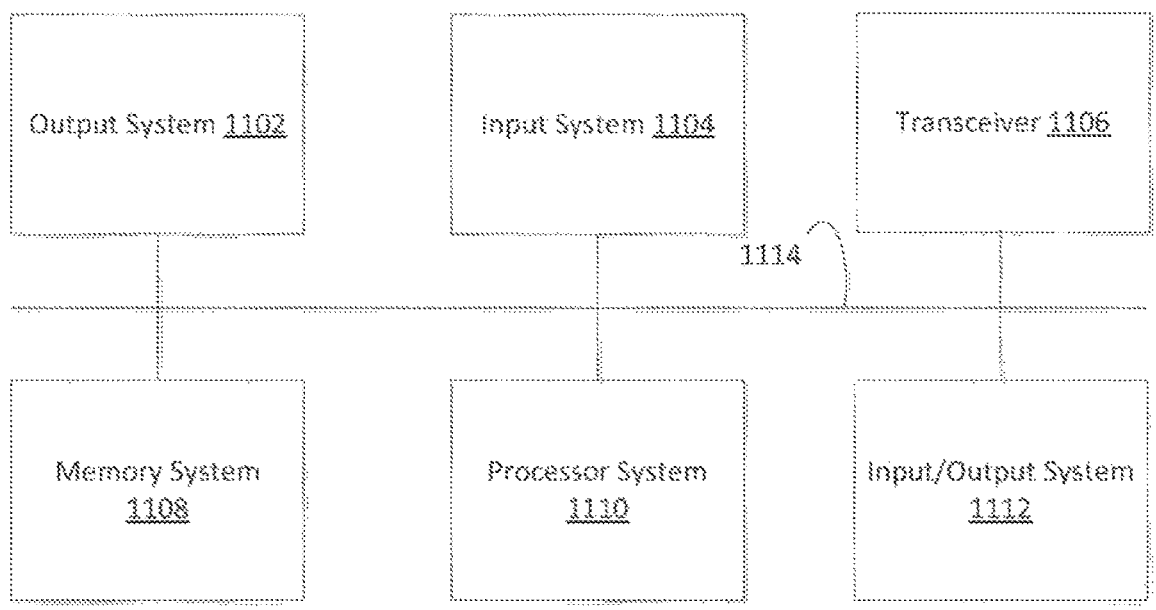
FIG. 11 shows a block diagram of an embodiment of a computer system for a publisher and a push service provider.

FIG. 11 shows an embodiment of a computer system 1100, which may be an embodiment of a computer system used by publisher 102 and/or push service provider 108. The computer system 1100 may include an output system 1102, an input system 1104, a transceiver 1106, a memory system 1108, a processor system 1110, an input/output system 1112, and a communication system 1114. Computer system 1100 is an example of a computer that may be used for the computer of publisher 102 and push service provider 108.

Output system 1102 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 1104 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Transceiver 1106 is a device comprising both a transmitter and a receiver (that both transmits and receives analog or digital signals) which are combined and share common circuitry or a single housing. Transceiver 1106 may include any one of, some of, any combination of, or all of multiple parallel transceivers or a single transceiver dedicated to wireless and/or wired communication through a local area network (LAN), a wide area network (WAN), or satellite communications networks. Also, transceiver 1106 may include, for example, a medium access unit (MAU). In another embodiment transceiver 1106 may be replaced with a separate receiver and transmitter.

Memory system 1108 may include any non-transitory machine memory. For example, memory system 1108 may include any one of, some of, any combination of, or all of a long term storage system, such as a hard drive; a short term storage system, such as random access memory; a removable storage system, such as a floppy drive or a removable drive; and/or flash memory. Memory system 1108 may include one or more machine readable mediums that may store a variety of different types of information. The term machine-readable medium is used to refer to any medium capable carrying information that is readable by a machine. One example of a machine-readable medium is a computer-readable medium. Another example of a machine-readable medium is paper having holes that are detected that trigger different mechanical, electrical, and/or logic responses. Publisher memory system 200 and push service provider memory system 300 may be memory system 1108.

Processor system 1110 may include any one of, some of, any combination of, or all of multiple parallel processors, a single processor, a system of processors having one or more central processors and/or one or more specialized processors dedicated to specific tasks. Also, processor system 1110 may include one or more Digital Signal Processors (DSPs) in addition to or in place of one or more Central Processing Units (CPUs) and/or may have one or more digital signal processing programs that run on one or more CPU. Processor system 1110 implements the computer instruction stored in memory 1108.

Input/output system 1112 may include devices that have the dual function as input and output devices. For example, input/output system 1112 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 1112 is optional, and may be used in addition to or in place of output system 1102 and/or input device 1104.

Communications system 1114 communicatively links output system 1102, input system 1104, memory system 1108, processor system 1110, and/or input/output system 1112 to each other. Communications system 1114 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Figure 12:
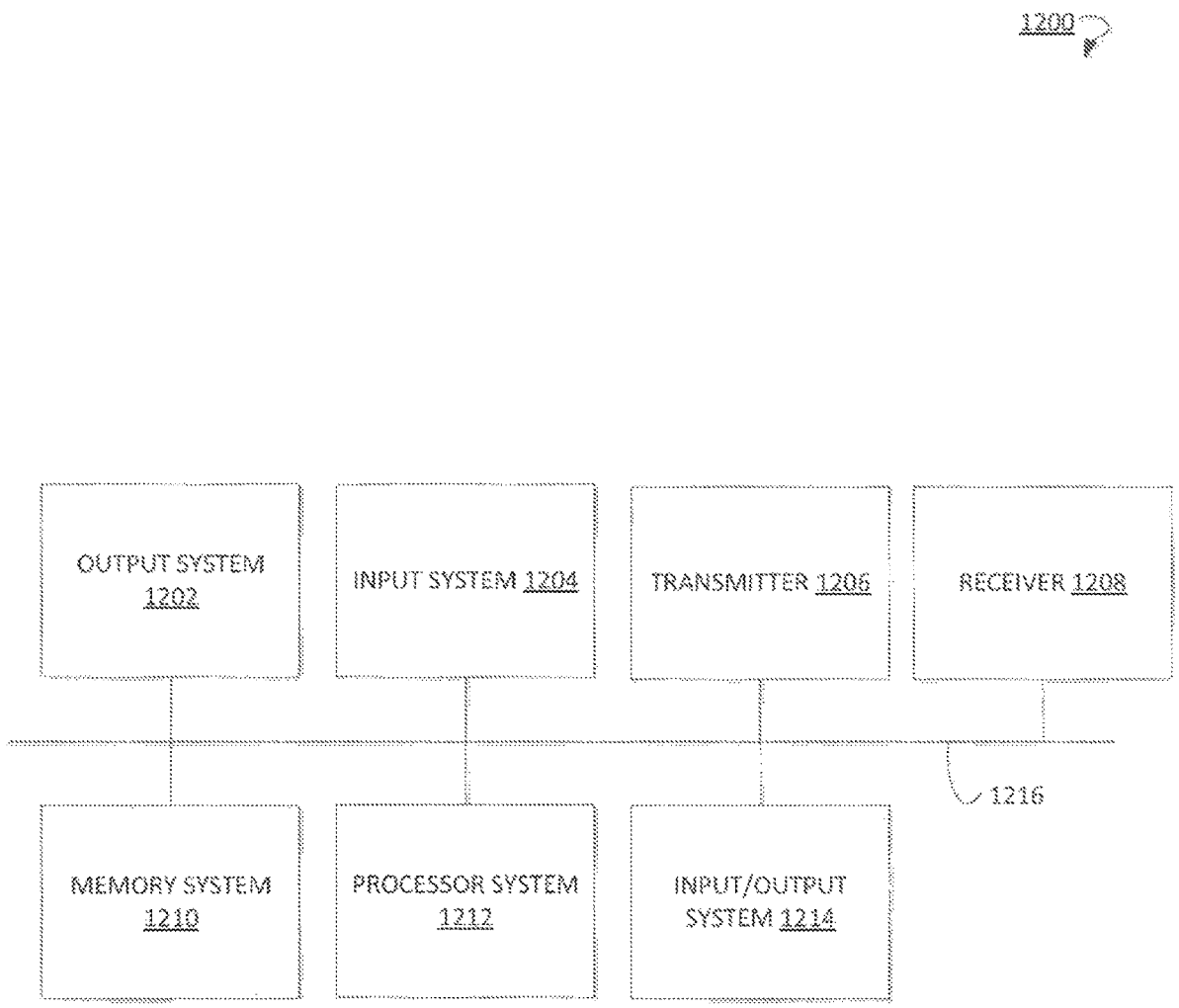
FIG. 12 shows a block diagram of an embodiment of a computer system of a user system.

FIG. 12 shows an embodiment of a computer system 1200 for a user system 114. Computer system 1200 may include an output system 1202, an input system 1204, a transmitter 1206, a receiver 1208, a memory system 1210, a processor system 1212, an input/output system 1214, and a communication system 1216. Computer system 1100 is an example of a computer that may be used for the computer of user system 114.

Output system 1202 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example.

Input system 1204 may include any one of, some of, any combination of, or all of a keyboard system, a mouse system, a trackball system, a track pad system, buttons on a handheld system, a scanner system, a microphone system, a connection to a sound system, and/or a connection and/or interface system to a computer system, intranet, and/or internet (e.g., IrDA, USB), for example.

Transmitter 1206 may include any one of, some of, any combination of multiple parallel transmitters or a single transmitter dedicated to sending information through wired and/or wireless communication in a local area network (LAN), a wide area network (WAN), or satellite communications networks.

Receiver 1208 may include any one of, some of, any combination of multiple parallel receivers or a single receiver dedicated to receiving information through wired and/or wireless communication in a local area network (LAN), a wide area network (WAN), or satellite communications networks. In another embodiment, transmitter 1206 and receiver 1208 may be replaced with a transceiver.

Memory system 1210 may include, for example, any one of, some of, any combination of, or all of non-transitory memory, such as a long term storage system, such as a hard drive; a short term storage system, such as random access memory; a removable storage system, such as a floppy drive or a removable drive; and/or flash memory. Memory system 1210 may include one or more machine-readable mediums that may store a variety of different types of information. The term machine-readable medium is used to refer to any medium capable of carrying information that is readable by a machine. One example of a machine-readable medium is a computer-readable medium. Another example of a machine-readable medium is paper having holes that are detected that trigger different mechanical, electrical, and/or logic responses. Memory system 1210 may include memory system 400.

Processor system 1212 may include any one of, some of, any combination of, or all of multiple parallel processors, a single processor, a system of processors having one or more central processors and/or one or more specialized processors dedicated to specific tasks. Also, processor system 1212 may include one or more Digital Signal Processors (DSPs) in addition to or in place of one or more Central Processing Units (CPUs) and/or may have one or more digital signal processing programs that run on one or more CPU. Processor system 1210 implements the computer instruction stored in memory 1208.

Input/output system 1214 may include devices that have the dual function as input and output devices. For example, input/output system 1214 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example.

Input/output system 1214 is optional, and may be used in addition to or in place of output system 1202 and/or input device 1204.

Communications system 1216 communicatively links output system 1202, input system 1204, memory system 1210, processor system 1212, and/or input/output system 1214 to each other. Communications system 1216 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

System Overview

Figure 13:
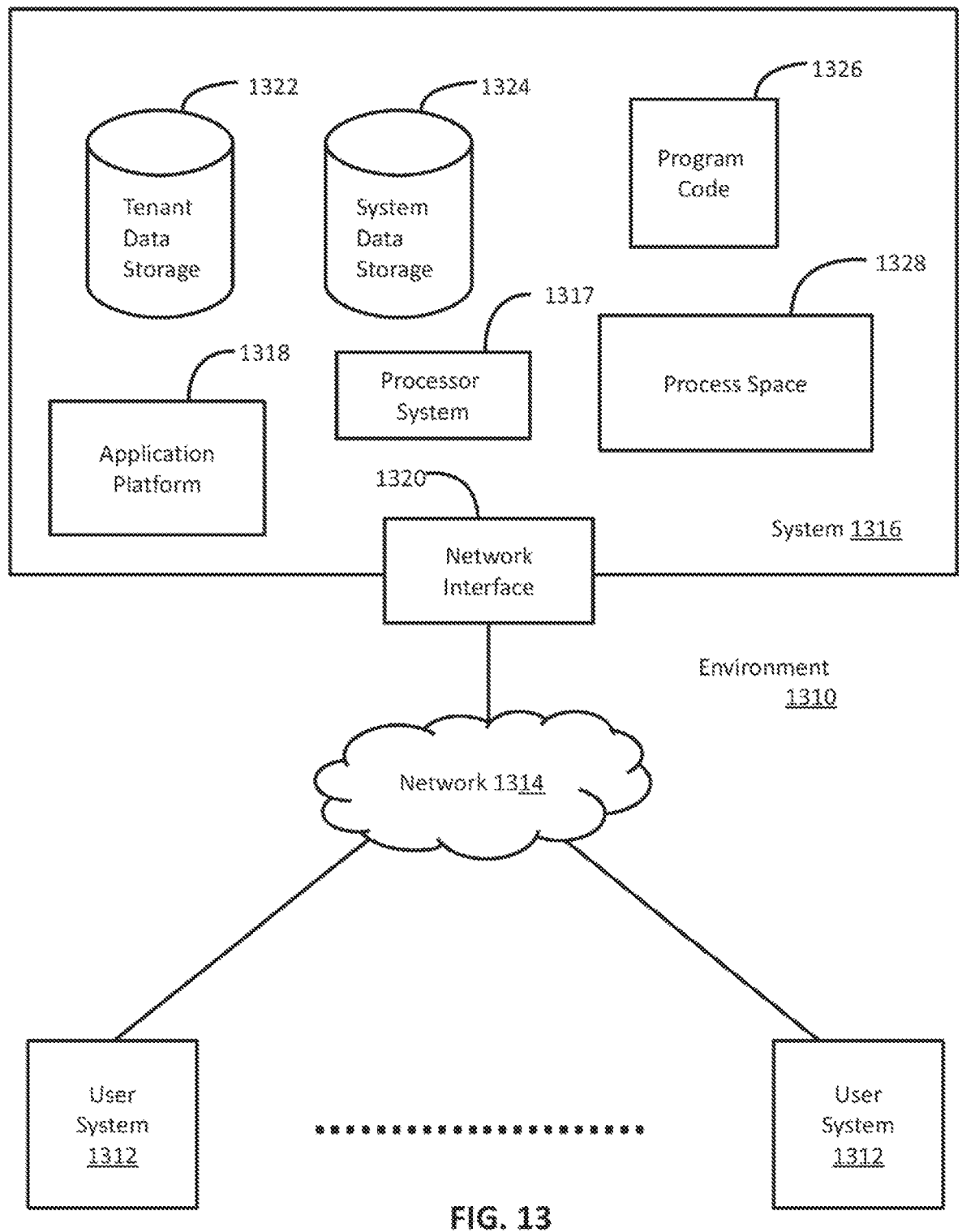
FIG. 13 shows a block diagram of an embodiment of an environment wherein an on-demand database service might be used.

FIG. 13 illustrates a block diagram of an environment 1310 wherein an on-demand database service might be used. Environment 1310 may include user systems 1312, network 1314, system 1316, processor system 1317, application platform 1318, network interface 1320, tenant data storage 1322, system data storage 1324, program code 1326, and process space 1328. In other embodiments, environment 1310 may not have all of the components listed and/or may have other elements instead of, or in addition to, those listed above.

Environment 1310 is an environment in which an on-demand database service exists. User system 1312 may be any machine or system that is used by a user to access a database user system. For example, any of user systems 1312 can be a handheld computing device, a mobile phone, a laptop computer, a work station, and/or a network of computing devices. As illustrated in FIG. 13 (and in more detail in FIG. 14) user systems 1312 might interact via a network 1314 with an on-demand database service, which is system 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" will be used interchangeably herein. A database image may include one or more database objects. A relational database management system (RDMS) or the equivalent may execute storage and retrieval of information against the database object(s). Application platform 1318 may be a framework that allows the applications of system 1316 to run, such as the hardware and/or software, e.g., the operating system. In an embodiment, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

The users of user systems 1312 may differ in their respective capacities, and the capacity of a particular user system 1312 might be entirely determined by permissions (permission levels) for the current user. For example, where a salesperson is using a particular user system 1312 to interact with system 1316, that user system has the capacities allotted to that salesperson. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 1312 might communicate with system 1316 using TCP/IP and, at a higher network level, use other common Internet protocols to communicate, such as HTTP, FTP, AFS, W AP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1316, shown in FIG. 13, implements a web-based customer relationship management (CRM) system. For example, in one embodiment, system 1316 includes application servers configured to implement and execute CRM software applications as well as provide related data, code, forms, webpages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 1316 implements applications other than, or in addition to, a CRM application. For example, system 1316 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 1316.

One arrangement for elements of system 1316 is shown in FIG. 13, including a network interface 1320, application platform 1318, tenant data storage 1322 for tenant data 1423, system data storage 1324 for system data 1425 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

Several elements in the system shown in FIG. 13 include conventional, well-known elements that are explained only briefly here. For example, each user system 1312 could include a desktop personal computer, workstation, laptop, PDA, cell phone, or any wireless access protocol (W AP) enabled device or any other computing device capable of interfacing directly or indirectly to the Internet or other network connection. User system 1312 typically runs an HTTP client, e.g., a browsing program, such as Microsoft's Internet Explorer browser, Netscape's Navigator browser, Opera's browser, or a W AP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314. Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory I Cs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 14:
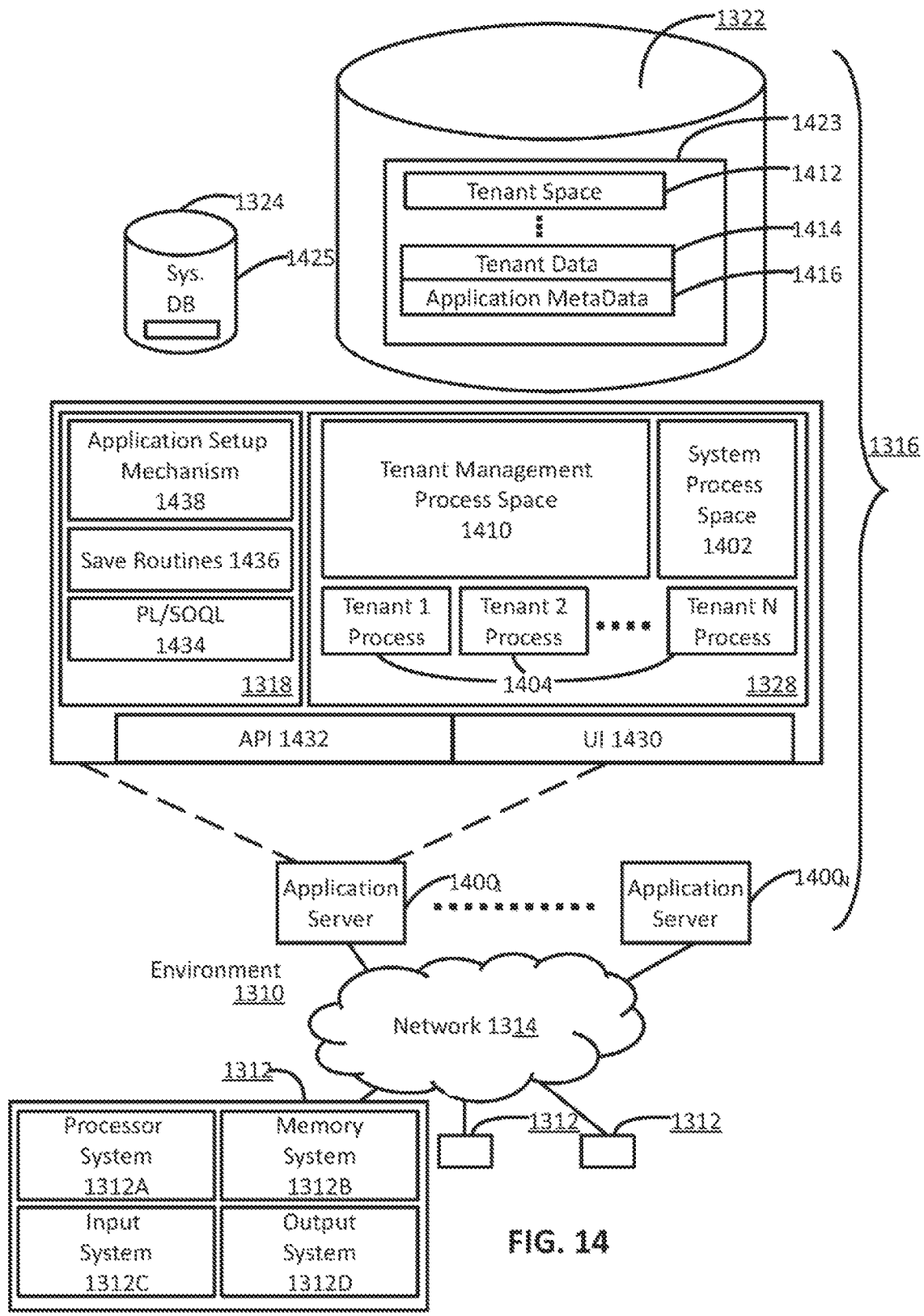
FIG. 14 shows a block diagram of an embodiment of elements of FIG. 13 and various possible interconnections between these elements.

FIG. 14 also illustrates environment 1310. However, in FIG. 14 elements of system 1316 and various interconnections in an embodiment are further illustrated. FIG. 14 shows that user system 1312 may include processor system 1312A, memory system 1312B, input system 1312C, and output system 1312D. FIG. 13 shows network 1314 and system 1316. FIG. 14 also shows that system 1316 may include tenant data storage 1322, tenant data 1423, system data storage 1324, system data 1425, User Interface (UI) 1430, Application Program Interface (API) 1432, PL/SOQL 1434, save routines 1436, application setup mechanism 1438, applications servers 14001-1400N, system process space 1402, tenant process spaces 1404, tenant management process space 1410, tenant storage area 1412, user storage 1414, and application metadata 1416. In other embodiments, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of one or more processors. Memory system 1312B may be any combination of one or more memory devices, short term, and/or long term memory. Input system 1312C may be any combination of input devices, such as one or more keyboards, mice, trackballs, scanners, cameras, and/or interfaces to networks. Output system 1312D may be any combination of output devices, such as one or more monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1423 therein, and system data storage 1324 and the system data 1425 therein to serve requests of user systems 1312. The tenant data 1423 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as one or more Oracle™ databases.

Application platform 1318 includes an application setup mechanism 1438 that supports application developers' creation and management of applications, which may be saved as metadata into tenant data storage 1322 by save routines 1436 for execution by subscribers as one or more tenant process spaces 1404 managed by tenant management process 1410 for example. Invocations to such applications may be coded using PL/SOQL 1434 that provides a programming language style interface extension to API 1432. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1316 for the subscriber making the invocation and executing the metadata as an application in a virtual machine.

Each application server 1400 may be communicably coupled to database systems, e.g., having access to system data 1425 and tenant data 1423, via a different network connection. For example, one application server 14001 might be coupled via the network 1314 (e.g., the Internet), another application server 1 400N-1 might be coupled via a direct network link, and another application server 1 400N might be coupled by yet a different network connection. Transfer Control Protocol and Internet Protocol (TCP/IP) are typical protocols for communicating between application servers 1400 and the database system. However, it will be apparent to one skilled in the art that other transport protocols may be used to optimize the system depending on the network interconnect used.

In certain embodiments, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In one embodiment, therefore, an interface system implementing a load balancing function (e.g., an F5 Big-IP load balancer) is communicably coupled between the application servers 1400 and the user systems 1312 to distribute requests to the application servers 1400. In one embodiment, the load balancer uses a least connections algorithm to route user requests to the application servers 1400. Other examples of load balancing algorithms, such as round robin and observed response time, also can be used. For example, in certain embodiments, three consecutive requests from the same user could hit three different application servers 1400, and three requests from different users could hit the same application server 1400. In this manner, system 1316 is multitenant, wherein system 1316 handles storage of, and access to, different objects, data and applications across disparate users and organizations.

As an example of storage, one tenant might be a company that employs a sales force where each salesperson uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain embodiments, user systems 1312 (which may be client systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., one or more SQL queries) that are designed to access the desired information. System data storage 1324 may generate query plans to access the requested data from the database.

Each database can generally be viewed as a collection of objects, such as a set of logical tables, including data fitted into predefined categories. A "table" is one representation of a data object, and may be used herein to simplify the conceptual description of objects and custom objects. It should be understood that "table" and "object" may be used interchangeably herein. Each table generally includes one or more data categories logically arranged as columns or fields in a viewable schema. Each row or record of a table includes an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each including pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/815,161, filed Apr. 2, 2004, entitled CUSTOM ENTITIES AND FIELDS IN A MULTI-TENANT DATABASE SYSTEM, and which is hereby incorporated herein by reference, teaches systems and methods for creating custom objects as well as customizing standard objects in a multi-tenant database system. In certain embodiments, for example, all custom entity data rows are stored in a single multi-tenant physical table, which may include multiple logical tables per organization. It is transparent to customers that their multiple "tables" are in fact stored in one large table or that their data may be stored in the same table as the data of other customers.

Method for Using the Environment (FIGS. 13 and 14)

Figure 15:
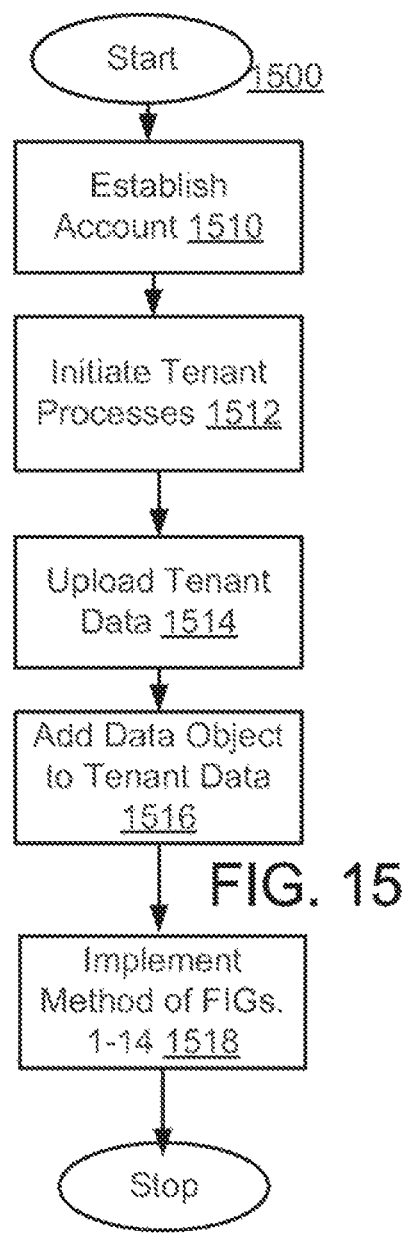
FIG. 15 shows a flowchart of an embodiment of a method of using the environment shown in FIG. 13.

FIG. 15 shows a flowchart of an example of a method 1500 of using environment 1310. In step 1510, user system 1312 (FIGS. 13 and 14) establishes an account. In step 1512, one or more tenant process space 1404 (FIG. 14) are initiated on behalf of user system 1312, which may also involve setting aside space in tenant space 1412 (FIG. 14) and tenant data 1414 (FIG. 14) for user system 1312. Step 1512 may also involve modifying application metadata to accommodate user system 1312. In step 1514, user system 1312 uploads data. In step 1516, one or more data objects are added to tenant data 1414 where the data uploaded is stored. In step 1518, the methods associated with FIGS. 13-14 may be implemented. In another embodiment, although depicted as distinct steps in FIG. 15, steps 1510-1518 may not be distinct steps. In other embodiments, method 1500 may not have all of the above steps and/or may have other steps in addition to, or instead of, those listed above. The steps of method 1500 may be performed in another order. Subsets of the steps listed above as part of method 1500 may be used to form their own method.

Method for Creating the Environment (FIGS. 13 and 14)

Figure 16:
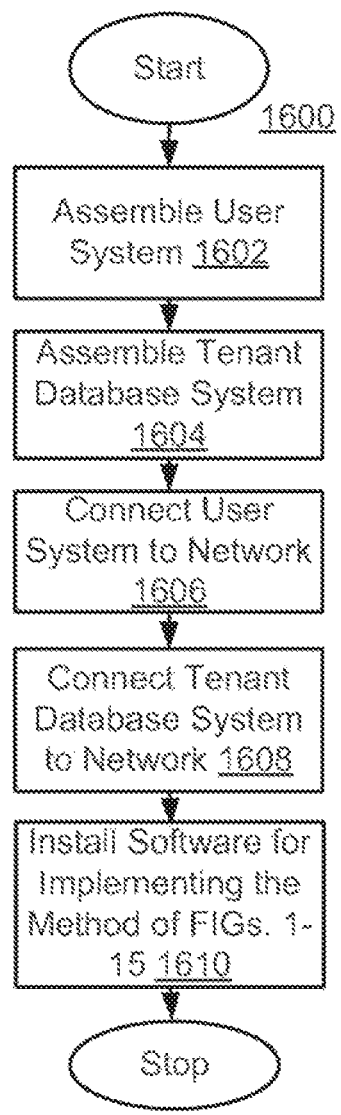
FIG. 16 shows a flowchart of an embodiment of a method of making the environment shown in FIG. 13.

FIG. 16 is a method of making environment 1310, in step 1602, user system 1312 (FIGS. 13 and 14) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1604, system 1316 (FIGS. 13 and 14) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 1316 may include installing application platform 1318, network interface 1320, tenant data storage 1322, system data storage 1324, system data 1425, program code 1326, process space 1328, UI 1430, API 1432, PL/SOQL 1434, save routine 1436, application setup mechanism 1438, applications servers 14001-1400N, system process space 1402, tenant process spaces 1404, tenant management process space 1410, tenant space 1412, tenant data 1414, and application metadata 1416 (FIG. 14).

In step 1606, user system 1312 is communicatively coupled to network 1404. In step 1608, system 1316 is communicatively coupled to network 1314 allowing user system 1312 and system 1316 to communicate with one another (FIG. 14). In step 1610, one or more instructions may be installed in system 1316 (e.g., the instructions may be installed on one or more machine readable media, such as computer readable media, therein) and/or system 1316 is otherwise configured for performing the steps of methods associated with FIGS. 1-13. For example, FIGS. 1-13 may be installed in program space 1326 of system 1316. In an embodiment, each of the steps of method 1600 is a distinct step. In another embodiment, although depicted as distinct steps in FIG. 16, steps 1602-1610 may not be distinct steps. In other embodiments, method 1600 may not have all of the above steps and/or may have other steps in addition to, or instead of, those listed above. The steps of method 1600 may be performed in another order. Subsets of the steps listed above as part of method 1600 may be used to form their own method.

Alternatives and Extensions

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

What is claimed is:

1. A method for implementing push notifications at a user device, comprising:
   receiving a first push notification having a first importance level within a range of importance levels, wherein each importance level within the range of importance levels comprises a same push notification setting;
   receiving a second push notification having a second importance level, wherein the second push notification comprises a second importance level within the range of importance levels, wherein the second importance level is different from the first importance level, and wherein the second push notification is received after the first push notification;
   determining a first push notification setting associated with the first push notification and determining a second push notification setting associated with the second push notification, wherein the second push notification setting is different from the first push notification setting, and wherein the first push notification setting is based at least in part on the first importance level and the second push notification setting is based at least in part on the second importance level;
   comparing the second importance level to a threshold importance level in response to receiving the second push notification after the first push notification; and
   implementing the first push notification setting and the second push notification setting in an order that is based at least in part on the first importance level and the comparing of the second importance level to the threshold importance level.

2. The method of claim 1, further comprising:
   determining the order to implement the first push notification setting and the second push notification setting after determining the first push notification setting and determining the second push notification setting, wherein determining the order is based at least in part on the first importance level and the second importance level.

3. The method of claim 2, wherein the first push notification setting is implemented before the second push notification setting based at least in part on the first importance level being higher than the second importance level.

4. The method of claim 1, wherein the first push notification setting and the second push notification setting each comprise an alert, an alarm, a pop-up, a badge count, or a combination thereof.

5. The method of claim 4, wherein the range of importance levels comprises the first importance level, the second importance level, a third importance level, and a fourth importance level, wherein the first push notification setting associated with the first importance level comprises a first sound and the pop-up, the second push notification setting associated with the second importance level comprises a second sound, a third push notification setting associated with the third importance level comprises a visual notification, and a fourth push notification setting associated with the fourth importance level comprises a non-auditory and non-visual notification.

6. The method of claim 4, further comprising:
   altering the first push notification setting, the second push notification setting, or both based at least in part on determining the first push notification setting and determining the second push notification setting.

7. The method of claim 1, wherein the first push notification and the second push notification are associated with a same application or a same application type.

8. The method of claim 1, further comprising:
   transmitting, to a database, an indication that the first push notification setting, the second push notification setting, or both were implemented at the user device.

9. The method of claim 1, wherein the first push notification setting and the second push notification setting are implemented concurrently.

10. The method of claim 1, further comprising:
    determining whether the first importance level is greater than the threshold importance level, wherein the first push notification setting is implemented before the second push notification setting when the first importance level is greater than the threshold importance level and greater than the second importance level; and determining whether the second importance level is greater than the threshold importance level, wherein the second push notification setting is implemented before the first push notification setting when the second importance level is greater than the threshold importance level and greater than the first importance level.

11. An apparatus comprising, comprising:
a processor,
memory in electronic communication with the processor; and
instructions stored in the memory and executable by the processor to cause the apparatus to:
receive a first push notification having a first importance level within a range of importance levels, wherein each importance level within the range comprises a same push notification setting;
receive a second push notification having a second priority level, wherein the second push notification comprises a second importance level within the range of importance levels, wherein the second importance level is different from the first importance level, and wherein the second push notification is received after the first push notification;
determine a first push notification setting associated with the first push notification and determining a second push notification setting associated with the second push notification, wherein the second push notification setting is different from the first push notification setting, and wherein the first push notification setting is based at least in part on the first importance level and the second push notification setting is based at least in part on the second importance level;
compare the second importance level to a threshold importance level in response to receiving the second push notification after the first push notification; and
implement the first push notification setting and the second push notification setting in an order that is based at least in part on the first importance level and the comparing of the second importance level to the threshold importance level.

12. The apparatus of claim 11, wherein the instructions are further executable by the processor to cause the apparatus to:
determine the order to implement the first push notification setting and the second push notification setting after determining the first push notification setting and determining the second push notification setting, wherein determining the order is based at least in part on the first importance level and the second importance level.

13. The apparatus of claim 12, wherein the first push notification setting is implemented before the second push notification setting based at least in part on the first importance level being higher than the second importance level.

14. The apparatus of claim 11, wherein the first push notification setting and the second push notification setting each comprise an alert, an alarm, a pop-up, a badge count, or a combination thereof.

15. The apparatus of claim 14, wherein the range of importance levels comprises the first importance level, the second importance level, a third importance level, and a fourth importance level, wherein the first push notification setting associated with the first importance level comprises a first sound and the pop-up, the second push notification setting associated with the second importance level comprises a second sound, a third push notification setting associated with the third importance level comprises a visual notification, and a fourth push notification setting associated with the fourth importance level comprises a non-auditory and non-visual notification.

16. The apparatus of claim 14, wherein the instructions are further executable by the processor to cause the apparatus to:
alter the first push notification setting, the second push notification setting, or both based at least in part on determining the first push notification setting and determining the second push notification setting.

17. The apparatus of claim 11, wherein the first push notification and the second push notification are associated with a same application or a same application type.

18. The apparatus of claim 11, wherein the instructions are further executable by the processor to cause the apparatus to:
transmit, to a database, an indication that the first push notification setting, the second push notification setting, or both were implemented at the user device.

19. The apparatus of claim 11, wherein the first push notification setting and the second push notification setting are implemented concurrently.

20. A non-transitory computer-readable medium storing code, the code comprising instructions executable by a processor to:
receive a first push notification having a first importance level within a range of importance levels, wherein each importance level within the range comprises a same push notification setting;
receive a second push notification having a second priority level, wherein the second push notification comprises a second importance level within the range of importance levels, wherein the second importance level is different from the first importance level, and wherein the second push notification is received after the first push notification;
determine a first push notification setting associated with the first push notification and determining a second push notification setting associated with the second push notification, wherein the second push notification setting is different from the first push notification setting, and wherein the first push notification setting is based at least in part on the first importance level and the second push notification setting is based at least in part on the second importance level;
compare the second importance level to a threshold importance level in response to receiving the second push notification after the first push notification; and
implement the first push notification setting and the second push notification setting in an order that is based at least in part on the first importance level and the comparing of the second importance level to the threshold importance level.

\* \* \* \* \*